US008606686B1

(12) United States Patent
Ippolito et al.

(10) Patent No.: US 8,606,686 B1
(45) Date of Patent: Dec. 10, 2013

(54) SYSTEM AND METHOD FOR GATHERING AND PERFORMING COMPLEX ANALYSES ON POWER DATA FROM MULTIPLE REMOTE SOURCES

(75) Inventors: David Ippolito, Glen Mills, PA (US); David Kucharczuk, Chadds Ford, PA (US)

(73) Assignee: Versify Solutions, Inc., Chadds Ford, PA (US)

( * ) Notice: Subject to any disclaimer, the term of this patent is extended or adjusted under 35 U.S.C. 154(b) by 160 days.

(21) Appl. No.: 12/399,682

(22) Filed: Mar. 6, 2009

Related U.S. Application Data

(60) Provisional application No. 61/064,483, filed on Mar. 7, 2008.

(51) Int. Cl.
*G06Q 40/00* (2012.01)
*G06Q 40/04* (2012.01)
*G06Q 40/06* (2012.01)

(52) U.S. Cl.
CPC ............ *G06Q 40/04* (2013.01); *G06Q 40/00* (2013.01); *G06Q 40/06* (2013.01)
USPC .............................................. 705/37; 705/40

(58) Field of Classification Search
USPC .......................................................... 705/37
See application file for complete search history.

(56) References Cited

U.S. PATENT DOCUMENTS

| | | | |
|---|---|---|---|
| 5,964,879 A | 10/1999 | Dunstan et al. | |
| 6,021,402 A * | 2/2000 | Takriti | 705/412 |
| 6,473,744 B1 * | 10/2002 | Tuck et al. | 705/412 |
| 6,633,823 B2 | 10/2003 | Bartone et al. | |
| 6,925,385 B2 | 8/2005 | Ghosh et al. | |
| 7,020,701 B1 | 3/2006 | Gelvin et al. | |
| 7,142,949 B2 | 11/2006 | Brewster et al. | |
| 7,162,444 B1 * | 1/2007 | Machado et al. | 705/35 |
| 7,233,843 B2 | 6/2007 | Budhraja et al. | |
| 7,246,156 B2 | 7/2007 | Ginter et al. | |
| 7,305,281 B2 | 12/2007 | Scott et al. | |
| 7,398,194 B2 | 7/2008 | Evans et al. | |
| 7,612,466 B2 | 11/2009 | Skutt | |
| 7,747,739 B2 | 6/2010 | Bridges et al. | |
| 7,752,106 B1 * | 7/2010 | Corby et al. | 705/35 |
| 7,840,607 B2 | 11/2010 | Henigman et al. | |
| 7,873,441 B2 | 1/2011 | Synesiou et al. | |
| 7,873,442 B2 * | 1/2011 | Tsui | 700/291 |
| 7,877,235 B2 * | 1/2011 | McConnell et al. | 702/188 |
| 7,885,917 B2 | 2/2011 | Kuhns et al. | |
| 7,925,552 B2 | 4/2011 | Tarbell et al. | |
| 7,930,070 B2 | 4/2011 | Imes | |
| 8,019,697 B2 | 9/2011 | Ozog | |
| 8,068,938 B2 | 11/2011 | Fujita | |

(Continued)

OTHER PUBLICATIONS

Guang Li, "Day-Ahead Electricity Price Forecasing in a Grid Environment," IEEE Transactions on Power Systems, vol. 22, No. 1, Feb. 2007.*

(Continued)

*Primary Examiner* — Kirsten Apple
*Assistant Examiner* — Joan Goodbody
(74) *Attorney, Agent, or Firm* — Morgan, Lewis & Bockius LLP

(57) ABSTRACT

The invention encompasses data analytics, and more specifically, encompasses the efficient gathering and management of data, and the execution of data analysis solutions on complex power and pricing.

36 Claims, 28 Drawing Sheets

(56) References Cited

U.S. PATENT DOCUMENTS

| | | |
|---|---|---|
| 2002/0123974 A1 | 9/2002 | Kurokawa et al. |
| 2002/0147670 A1 | 10/2002 | Lange |
| 2003/0055776 A1 | 3/2003 | Samuelson |
| 2003/0163224 A1 | 8/2003 | Klaar et al. |
| 2003/0182250 A1* | 9/2003 | Shihidehpour et al. ......... 706/21 |
| 2004/0024483 A1 | 2/2004 | Holcombe |
| 2005/0004858 A1 | 1/2005 | Foster et al. |
| 2005/0027636 A1 | 2/2005 | Gilbert et al. |
| 2005/0125104 A1 | 6/2005 | Wilson et al. |
| 2005/0165511 A1 | 7/2005 | Fairlie |
| 2005/0171704 A1 | 8/2005 | Lewis et al. |
| 2005/0197742 A1 | 9/2005 | Scott et al. |
| 2005/0234600 A1 | 10/2005 | Boucher et al. |
| 2006/0047369 A1 | 3/2006 | Brewster et al. |
| 2006/0155423 A1 | 7/2006 | Budike |
| 2006/0259199 A1 | 11/2006 | Gjerde et al. |
| 2007/0124026 A1 | 5/2007 | Troxell et al. |
| 2007/0220907 A1 | 9/2007 | Ehlers |
| 2007/0271173 A1 | 11/2007 | Johnson et al. |
| 2008/0049013 A1* | 2/2008 | Nasle ............................ 345/419 |
| 2008/0091580 A1 | 4/2008 | Kremen |
| 2008/0167756 A1 | 7/2008 | Golden et al. |
| 2008/0177678 A1 | 7/2008 | Di Martini et al. |
| 2009/0083167 A1 | 3/2009 | Subbloie |
| 2009/0088991 A1 | 4/2009 | Brzezowski et al. |
| 2009/0187284 A1 | 7/2009 | Kreiss et al. |
| 2009/0187499 A1 | 7/2009 | Mulder et al. |
| 2009/0281674 A1 | 11/2009 | Taft |
| 2010/0064001 A1 | 3/2010 | Daily |
| 2010/0076835 A1 | 3/2010 | Silverman |
| 2010/0145532 A1 | 6/2010 | Gregory et al. |
| 2010/0179862 A1* | 7/2010 | Chassin et al. .................. 705/10 |
| 2011/0060476 A1 | 3/2011 | Iino et al. |
| 2012/0271686 A1 | 10/2012 | Silverman |

OTHER PUBLICATIONS

Xiaoming Feng; Le Tang Zhengyuan Wang; Jian Yang; Wong, W.; Chao, H.; Mukerji, R.; , "A new breed of software tool for integrated electrical power system and market analysis-GridView," Power Engineering Society Summer Meeting, 2002 IEEE , vol. 2, no., pp. 737-743 vol. 2, Jul. 25-25, 2002.*

Wang, Hui-Fung Francis, "Power Systems Locational Marginal Pricing in Deregulated Markets," A dissertation. Tulane University, 2003.*

Jian Yang; , "A market monitoring system for the open electricity markets," Power Engineering Society Summer Meeting, 2001. IEEE , vol. 1, no., pp. 235-240 vol. 1, 2001.*

Hong, Ying-Yi, et al., "A neuro-fuzzy price forecasting approach in deregulated electricity markets," Electrical Power Systems Research, vol. 73, 2005, pp. 151-157.*

Henderson, M.; Wong, P.; Platts, J.; Burke, R.; , "Planning for reliability, economics, and the environment in a deregulated market," Power and Energy Society General Meeting—Conversion and Delivery of Electrical Energy in the 21st Century, 2008 IEEE , vol., no., pp. 1-9, Jul. 20-24, 2008.*

USPTO—U.S. Appl. No. 13/556,535—Non-Final Office Action—Issued on Feb. 22, 2013.

USPTO—U.S. Appl. No. 12/430,515—Final Office Action—Issued on Mar. 12, 2013.

USPTO—U.S. Appl. No. 12/399,689—Non-Final Office Action—Issued on May 22, 2013.

USPTO—U.S. Appl. No. 12/437,388—Final Office Action—Issued on Jun. 13, 2013.

* cited by examiner

| Facility | DA | RT |
|---|---|---|
| AST E/CORONA/JAMAICA | 0 | 2 |
| ASTORIAE 138 HELLGT_E 138 1 | 0 | 1 |
| CENTRAL EAST - VC | 1 | 2 |
| DUNWODIE 345 SHORE_RD 345 1 | 1 | 2 |
| E179THST HELLGT_E 138 1 | 1 | 1 |
| E179THST HELLTP_W 138 1 | 1 | 0 |
| FRESHKLS 138 WILLWBRK 138 1 | 1 | 1 |
| GOWANUSN 138 GREENWD 138 1 | 1 | 1 |
| GOWANUSN 138 GREENWSS 138 1 | 1 | 1 |
| GREENWD 138 VERNON 138 1 | 0 | 1 |
| NQNY ACTIVE DNI | 1 | 0 |
| MOTTHAVN 345 RAINY 345 2 | 1 | 0 |
| NYCAACTIVE DNI | 3 | 0 |
| PIAC ACTIVE DNI | 1 | 0 |
| RAINY 138 VERNON 138 1 | 1 | 1 |
| SCH - NE - NY | 1 | 0 |

| Company | Status | Req Type | From | Station | Equipment | Type/KV | Planned Start | Planned End | Actual Start | Actual End |
|---|---|---|---|---|---|---|---|---|---|---|
| CONVEX | Approved | Schedule for TO | HADAMNK | | 14B-1T-2 | CB | 3/8/2008 0600 | 3/8/2008 1600 | | |
| CONVEX | Approved | Schedule for TO | HADAMNK | | 14B-2T-2 | CB | 3/8/2008 0600 | 3/8/2008 1600 | | |
| CONVEX | Approved | Schedule for TO | HADAMNK | | 3645.364 | CB | 3/8/2008 0600 | 3/8/2008 1600 | | |
| CONVEX | Approved | Planned | MONTVLLE | | 384: MONTVLLE | LN | 3/8/2008 0600 | 3/8/2008 1600 | | |
| CONVEX | Approved | Schedule for TO | DEVON | | 7R-20T-2 | CB | 2/21/2008 0600 | 3/8/2008 1800 | | |
| CONVEX | Approved | Schedule for TO | DEVON | | 7R-21T-2 | CB | 2/21/2008 0600 | 3/8/2008 1800 | | |
| REMVEC | Approved | Planned | FRNKLNSQ | | T20 | CB | 3/8/2008 0800 | 3/8/2008 1500 | | |

| ISO | Node | Avg Rt | DA | 05 | 10 | 15 | 20 | 25 | 30 | 35 | 40 | 45 | 50 | 55 | 00 |
|---|---|---|---|---|---|---|---|---|---|---|---|---|---|---|---|
| MISO | MICHIGAN.HUB | $32.41 | $35.65 | $34.58 | $32.41 | $35.65 | $34.58 | $32.41 | $35.65 | $34.58 | $32.41 | $35.65 | | | |
| MISO | MINN.HUB | $27.38 | $33.99 | $29.16 | $27.38 | $33.99 | $29.16 | $27.38 | $33.99 | $29.16 | $27.38 | $33.99 | | | |
| PJM | PEACHBOT13KV 343SU | $52.34 | $41.21 | $46.00 | $52.34 | $41.21 | $46.00 | $52.34 | $41.21 | $46.00 | $52.34 | $41.21 | | | |
| PJM | PECO | $52.94 | $42.14 | $46.66 | $52.94 | $42.14 | $46.66 | $52.94 | $42.14 | $46.66 | $52.94 | $42.14 | | | |

| ISO | Type | Start Time | End Time | Constraint Name |
|---|---|---|---|---|
| MISO | DA | 2/24/2009 1:00:00 AM | 2/24/2009 11:00:00 PM | X_OST2_5R-ANGLE_BASE_20090224_172 |
| MISO | DA | 2/24/2009 1:00:00 AM | 2/24/2009 11:00:00 PM | X_OST2_5R-ANGLE_BASE_20090224_173 |
| MISO | DA | 2/24/2009 1:00:00 AM | 2/24/2009 11:00:00 PM | AEPMET_INFR_20090224_7 |
| MISO | DA | 2/24/2009 1:00:00 AM | 2/24/2009 11:00:00 PM | AEPMET_INFR_20090224_8 |
| MISO | DA | 2/24/2009 1:00:00 AM | 2/24/2009 11:00:00 PM | AEPMET_INFR_20090224_9 |

FIG. 12

SYSTEM AND METHOD FOR GATHERING AND PERFORMING COMPLEX ANALYSES ON POWER DATA FROM MULTIPLE REMOTE SOURCES

This application claims the benefit of U.S. provisional patent application No. 61/064,483, which was filed on Mar. 7, 2008 and is incorporated herein by reference in its entirety.

FIELD OF THE INVENTION

The invention encompasses data analytics, and more specifically, encompasses the efficient gathering and management of data, and the execution of data analysis solutions on complex power and pricing.

DISCUSSION OF THE RELATED ART

In the power trading markets, power traders demand accurate, powerful, robust, and reliable data analysis systems. Power markets are comprised of Independent System Operators (ISO) and Regional Transmission Organizations (RTO), each of which is responsible for a specific geographical region that receives power transmission from one or more power generators. Each ISO/RTO is comprised of one or more regional power market, which can be considered as "assigned" to a subset geographical power region of its parent set's (i.e., ISO/RTO) region. Moreover, one or more power "nodes" exist within each of the regional power markets and, accordingly, belong to that specific regional power market. Within each ISO/RTO regional power market, power prices are: (a) established, (b) tracked, and (c) published according to supply and demand fundamentals, as power is traded and eventually generated. For each power node within a specific ISO/RTO regional power market, power prices vary individually. Therefore, for purposes of the power trading markets, power is typically traded on an hourly basis at each node, in a dutch-type auction market. Moreover, there is also a "day ahead" (DA) market that allows traders to bid/offer power into the market on a DA basis. With respect to the DA market, the ISO/RTO for the specific geographical region that is affected by one or more given DA trades determines the final DA price for each power node on which a bid/offer is placed. Subsequently, on an hourly basis, each ISO/RTO alerts each power trader who placed a bid/offer into its market(s) as to which DA trades were executed.

As for the operation of the actual power generation markets, which significantly affects the decisions made by power traders as well as the trading positions they choose to exercise, power generation may become disrupted in real time due to multiple factors. Some of these factors include, for example, power congestion, weather-related conditions, unexpected generator/transmission outages, or even differences between forecasted and actual power demand (i.e., power "load"). These factors taken in the aggregate, or individually, can easily disrupt the power grid. Therefore, as a direct proximate cause, these factors have a significant impact on power traders' decisions to exercise certain trade and/or develop certain trading strategies. Furthermore, whether the impact on the power grid is positive or negative, its root cause(s) simply translates into a proportionally weighed causal factor that "drives one or more power nodes' prices.

Additionally, every power node in an ISO/RTO market is assigned an actual "real time" (RT) price. Similar to the way in which DA trading is performed, the RT prices are also capable of being traded in a real time market (sometimes referred to as a "spot market"), as prices are published hourly by the appropriate ISO/RTO. Coupled together, the DA and RT prices are commonly known as Locational Marginal Pricing (LMP) data. LMP data is considered to be vital for power traders engaged in active trading, as well as for developing trading strategies, across various ISO/RTO markets. Accordingly, correlation between LMP data, power data, and the causal factors affecting at least this data from a recent or historical data analysis perspective would provide power traders valuable insight into the market. From a historical data perspective, the correlations between power data and LMP data in the power trading markets, according to causal factors, would assist the power trader in determining how the market would react in similar situations in the future because power trading markets tend to mimic their past/historical performance(s) when the same/similar causal factors are presented.

However, current data analysis systems that are tailored towards power traders for use in the power or energy trading markets only offer very limited data analysis capabilities. First, current data analysis systems do not make use of the full set of available power and price data. Moreover, these systems operate in a static manner and do not support dynamic data gathering, management, and analysis methodologies. Second, current data analysis systems also do not have the capability to gather, manage, and analyze data such that certain cause and effect scenarios can be determined accurately. For example, using current systems, power data such as power pricing data from the various markets cannot be managed and analyzed, in view of usage, congestion, weather-related conditions, and transmission outages, such that cause and effect factors are properly linked and identified to inform power traders to make appropriate market decisions.

SUMMARY OF THE INVENTION

Accordingly, the invention encompasses systems and methods for gathering and performing analyses on power data from multiple remote sources that substantially obviates one or more problems due to limitations and disadvantages of the related art.

An encompassed feature of the invention is a powerful, efficient, and robust power data management and analysis capabilities to allow power traders to make well-informed, confident trades, as well as to develop similar trading strategies.

Another encompassed feature of the invention is an efficient power data management solution that seamlessly retrieves, formats, and analyzes large quantities of power data from many remote sources, and provides various reports.

Additional features and advantages of the invention will be set forth in the description which follows, and in part will be apparent from the description, or may be learned by practice of the invention. The embodiments and other advantages of the invention will be realized and attained by the structure particularly pointed out in the written description and claims hereof as well as the appended drawings.

To achieve these and other advantages and in accordance with the purpose of the invention, as embodied and broadly described, the systems and methods for gathering and performing complex analyses on power data from multiple remote sources includes a system, including a data gathering unit to gather power data and locational marginal pricing (LMP) data from a plurality of remote power data sources and to convert the power data and the LMP data into a common data format; a data analysis unit to correlate the power data with the LMP data based on causal factors; a database to store at least the gathered power data and the LMP data, the converted power data and the LMP data, and the correlated data of causal factors; and a display unit to display at least one of the converted power data and the LMP data, and the correlated data of causal factors.

Another illustrative embodiment of the invention encompasses methods including the steps of: gathering power data and LMP data from a plurality of remote power data sources and converting the power data and the LMP data into a common data format; correlating the power data with the LMP data based on causal factors; storing at least the gathered power data and the LMP data, the converted power data and the LMP data, and the correlated data of causal factors; and displaying at least one of the converted power data and the LMP data, and the correlated data of causal factors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the illustrative embodiments of the invention and are incorporated in and constitute a part of this specification, illustrate embodiments of the invention and together with the description serve to explain the principles of the invention.

FIG. 12 illustrates an exemplary embodiment of a five-minute ticker report interface.

DETAILED DESCRIPTION OF THE INVENTION

Figure 1:
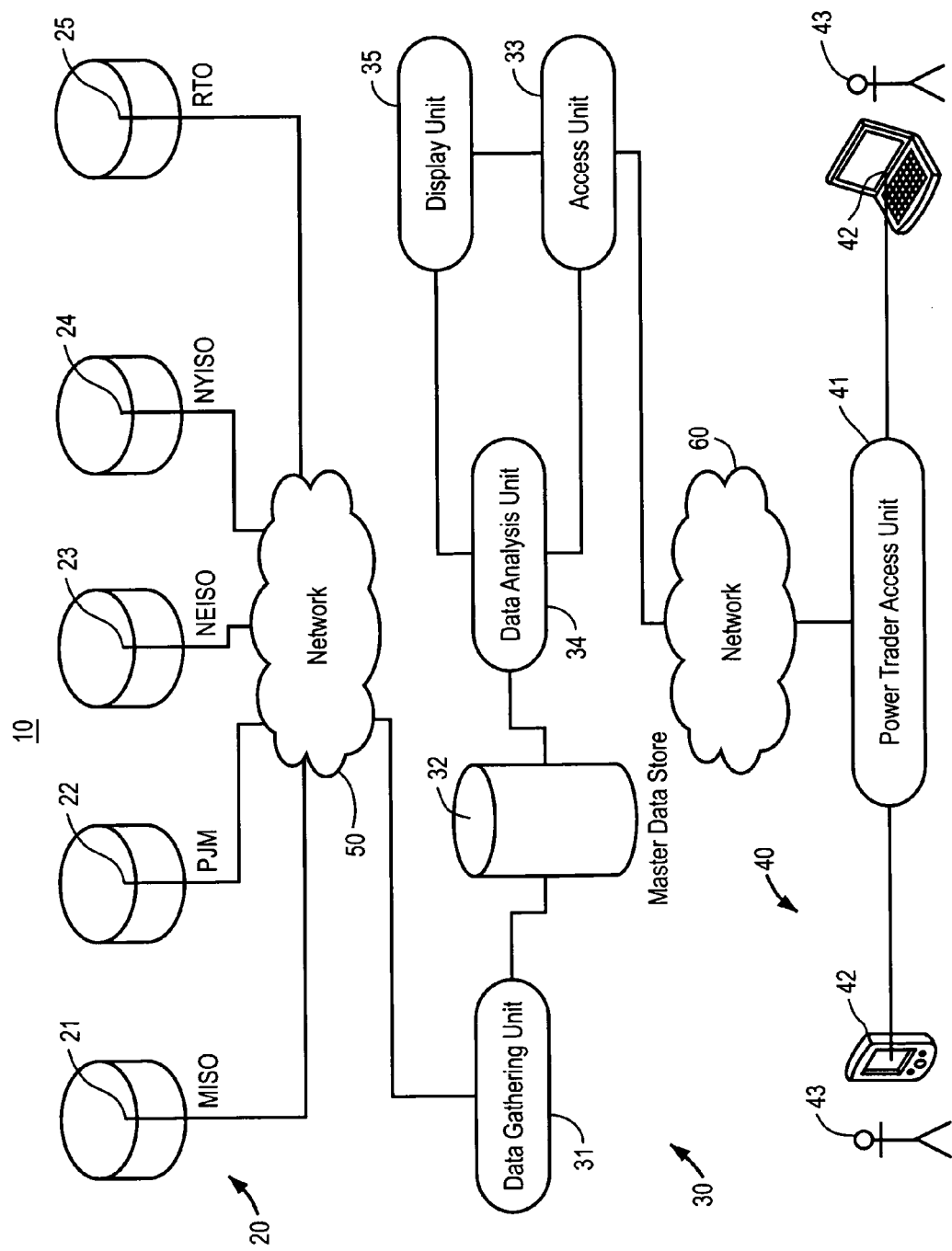
FIG. 1 is a block diagram illustrating an exemplary embodiment of the system and data architecture of the present invention.

The invention encompasses a system including:
a data gathering unit to gather power data and locational marginal pricing (LMP) data from a plurality of remote power data sources and to convert the power data and the LMP data into a common data format;
a data analysis unit to correlate the power data with the LMP data for identifying causal factors;
a database to store at least the gathered power data and the LMP data, the converted power data and the LMP data, and the correlated data of causal factors; and
a display unit to display at least one of the converted power data and the LMP data, and the correlated data of causal factors.

In certain illustrative embodiments, the data gathering unit gathers power data and LMP data over a network.

In certain illustrative embodiments, the system further comprises an access unit to grant access to one or more remote users.

In certain illustrative embodiments, the one or more remote users are power traders in at least one power trading market.

In certain illustrative embodiments, the system further comprises a remote user device.

In certain illustrative embodiments, the display unit transmits display signals to the remote user device.

In certain illustrative embodiments, the system further comprises a price reporting unit to generate at least one price summary report.

In certain illustrative embodiments, the price summary report is presented based on filter criteria, the filter criteria including at least one of a price report type, start date, end date, day type, hour type, independent system operator (ISO) type, node type, delta value, standard deviation value, rank-by value, and LMP type.

In certain illustrative embodiments, the system further comprises a chart analysis unit to compare at least one of the converted power data and the LMP data and the correlated data of causal factors and to generate at least one chart analysis report.

In certain illustrative embodiments, the chart analysis report is generated based on filter criteria, the filter criteria including at least one of a start date, an end date, a day type, a hour type, a time zone type, a plurality of node types, a plurality of ISO/zone types, a plurality of weather types, and a compare nodes type.

In certain illustrative embodiments, the system further comprises a price look-back unit to retrieve the converted power data and the LMP data, and the correlated data of causal factors according to at least look-back criteria.

In certain illustrative embodiments, the look-back criteria includes at least one of a temperature value, a load value, an outage value, an ISO type, a weather type, a forecast date, a day value, a hour type, a matching hour value, a start date, and an end date.

In certain illustrative embodiments, the look-back criteria includes at least one of a fuel index type, a fuel index price, a constraint type, and a transmission outage type.

In certain illustrative embodiments, the retrieved data is passed to a price reporting unit to generate at least one price look-back report according to filter criteria.

In certain illustrative embodiments, the filter criteria includes at least a price report type.

In certain illustrative embodiments, the system further comprises a look-back results unit to display the retrieved data according to at least one of a date value, a day value, an average load forecast value, an outage value, an actual outage value, an average temperature value, a spot fuel value, and a price report type.

In certain illustrative embodiments, the system further comprises a compare node unit to compare nodes to the retrieved data.

In certain illustrative embodiments, the price report type includes at least one of a scouting summary, scouting detail, hourly spread, hourly averages, node ranking, top nodes, LMP breakdown, day ahead (DA) constraints, constraint frequency, weather forecast, weather forecast versus actual forecast, fuel prices, financial transmission rights (FTR) monthly auction, RSG/OP reserves, and transmission outages.

In another embodiment, the invention encompasses a computer-implemented method, including the steps of:

gathering power data and locational marginal pricing (LMP) data from a plurality of remote power data sources and converting the power data and the LMP data into a common data format;

correlating the power data with the LMP data for identifying causal factors;

storing at least the gathered power data and the LMP data, the converted power data and the LMP data, and the correlated data of causal factors; and displaying at least one of the converted power data and the LMP data, and the correlated data of causal factors.

In certain illustrative embodiments, the gathering of power data and LMP data from a plurality of remote power data sources is performed over a network.

In certain illustrative embodiments, the computer-implemented further comprises the step of granting access to one or more remote users.

In certain illustrative embodiments, the one or more remote users are power traders in at least one power trading market.

In certain illustrative embodiments, the displaying step further comprises displaying signals on a remote user device.

In certain illustrative embodiments, the displaying signals are transmitted to the remote user device.

In certain illustrative embodiments, the computer-implemented method further comprises the step of generating at least one price summary report.

In certain illustrative embodiments, the price summary report is generated based on filter criteria, the filter criteria including at least one of a price report type, start date, end date, day type, hour type, independent system operator (ISO) type, node type, delta value, standard deviation value, rank-by value, and LMP type.

In certain illustrative embodiments, the computer-implemented method further comprises the step of comparing at least one of the converted power data and the LMP data and the correlated data of causal factors and generating at least one chart analysis report.

In certain illustrative embodiments, the chart analysis report is generated based on filter criteria, the filter criteria including at least one of a start date, an end date, a day type, a hour type, a time zone type, a plurality of node types, a plurality of ISO/zone types, a plurality of weather types, and a compare nodes type.

In certain illustrative embodiments, the computer-implemented method further comprises the step of retrieving the converted power data and the LMP data, and the correlated data of causal factors according to at least look-back criteria.

In certain illustrative embodiments, the look-back criteria includes at least one of a temperature value, a load value, an outage value, an ISO type, a weather type, a forecast date, a day value, a hour type, a matching hour value, a start date, and an end date.

In certain illustrative embodiments, the look-back criteria includes at least one of a fuel index type, a fuel index price, a constraint type, and a transmission outage type.

In certain illustrative embodiments, the computer-implemented method further comprises the step of passing the retrieved data and generating at least one price summary report according to filter criteria.

In certain illustrative embodiments, the filter criteria includes at least a price report type.

In certain illustrative embodiments, the computer-implemented method further comprises the step of displaying the retrieved data according to at least one of a date value, a day value, an average load forecast value, an outage value, an actual outage value, an average temperature value, a spot fuel value, and a price report type.

In certain illustrative embodiments, the computer-implemented method further comprises the step of comparing nodes to the retrieved data.

In certain illustrative embodiments, the price report type includes at least one of a scouting summary, scouting detail, hourly spread, hourly averages, node ranking, top nodes, LMP breakdown, day ahead (DA) constraints, constraint frequency, weather forecast, weather forecast versus actual forecast, fuel prices, financial transmission rights (FTR) monthly auction. RSG/OP reserves, and transmission outages.

In another embodiment, the invention encompasses a computer-readable storage medium, storing one or more programs configured for execution by one or more processors, the one or more programs comprising instructions to:

gather power data and locational marginal pricing (LMP) data from a plurality of remote power data sources and convert the power data and the LMP data into a common data format;

correlate the power data with the LMP data for identifying causal factors;

store at least the gathered power data and the LMP data, the converted power data and the LMP data, and the correlated data of causal factors; and display at least one of the converted power data and the LMP data, and the correlated data of causal factors.

Reference will now be made in detail to the embodiments of the invention, examples of which are illustrated in the accompanying drawings. Wherever possible, like reference numbers will be used for like elements.

FIG. 1 is a block diagram illustrating an exemplary embodiment of the system and data flow architecture of the present invention. As illustrated in FIG. 1, the exemplary embodiment includes data processing layers and communication interface layers. The data processing layers may, for example, include a remote power data sources layer 20, a system layer 30 (comprising at least one or more of a computer server, a database, and a network communication device) and a power trading market layer 40. Further, the communication interface layer may include local area networks (LAN) or wide area networks (WAN) 50 and 60. However, other data and communication layers may be used without departing from the scope of the invention.

As further illustrated in FIG. 1, the remote power data sources layer 20 includes several power and price data stores 21-25. Each of the data stores 21-25 contains power and price data from a specific Independent System Operator (ISO) or Regional Transmission Organization (RTO) power market. For example, the MISO 21 data store contains power and price data from the Midwest ISO; the PJM 22 data store contains power and price data from the Pennsylvania, New Jersey, and Maryland ISO; the NEISO 23 data store contains power and price data from the New England ISO; the NYISO 24 data store contains power and price data from the New York ISO; and, the RTO 25 data store contains power and price data from an RTO. Each of these data stores 21-25 is publicly accessible and may be queried directly, or via a local or wide area network 50 and/or 60.

Because the data formats (also referred to as data schemas) of the data stores 21-25 may not be consistent among the data stores 21-25, the data gathering unit 31 implements a plurality of customized routines to convert the power and price data into at least one common data format. To accurately complete the data formatting routine, the data gathering unit 31 is regularly updated with the latest customized routines that include data format changes on each data store. Accordingly, the data gathering unit 31 normalizes data from the disparate remote data sources for efficient data handling by other units within the system layer 30. Additionally data gathering unit 31 acts as a layer of abstraction that insulates/encapsulates the other units from having to undergo changes as data stores may edit their respective data formats. The data gathering unit 31 may also implement the actual data format changes that should be made as data stores edit their respective data formats. Alternatively, the data gathering unit 31 may invoke outside procedures, which are updated as any edits are made to the data formats. Further, the outside procedures may be executed via the master data store 32, or any other data store that supports the procedures' successful execution. The data gathering unit 31 may, in some instances, execute on an hourly basis because the ISO/RTO markets publish and/or update their data at such time intervals. In a one day period the ISO/RTO markets could publish and/or update their data—in different data formats—at least twenty-four (24) times; this frequency factor when multiplied by the number of ISO/RTO markets, five (5) of which are shown in the exemplary embodiment of FIG. 1, is an example of the operational frequency of the data gathering unit 31. For example, according to this sample frequency scenario as applied to the exemplary embodiment, the data gathering unit 31 would execute one hundred-twenty (120) different times in just a one day period. If either the frequency of the data's publications/updates is increased (i.e., bi-hourly or even more frequent), or the number of accessed ISO/RTO markets is increased, the data gathering unit 31 would have to execute at frequency intervals paralleling those of the ISO/RTO markets' publications/updates.

After the data gathering unit 31 gathers and normalizes the data from the data stores 21-25, the gathered power and price data converted to a common data format are sent from the data gathering unit 31 to the master data store 32 for storage and later retrieval/query access by other units of the system layer 30. The master data store 32 may be implemented using any type of data base management system (DBMS) such as, for example, SQL Server™, Oracle™, or Accessr™. However, other DBMS or data storage solutions (e.g., files, memory, etc.) may be used without departing from the scope of the invention.

The master data store 32 includes power data, price data (including locational marginal pricing (LMP) data), and causal factors data obtained from the various remote power data sources 20. In an exemplary embodiment, the gathered power data and price data from each ISO/RTO region may be logically/physically stored together, while the same data may be stored separately from another ISO/RTO region's data. Furthermore, with each of the various ISO/RTO databases, the power and price data is partitioned according to a month of the year to which it applies. As a consequence of this multi-tiered data organization and storage scheme, the queries applied against each tier of data may only traverse a specific ISO/RTO region's data according to a specific month of the year, and not necessarily the entire depth and breadth of ISO/RTO region data that is available on the master data store 32. Of course, one of ordinary skill in the art will recognize that queries (like those written using the structure query language, SQL) can be broadened or narrowed accordingly and do not have to conform to this specific implementation. For example, SQL or other types of queries may be written in such a way as to combine months or ISO/RTO regions/markets in order to broaden the scope of their data coverage. Similarly, the queries may also be limited to narrower subsets of data within a month, regional power markets within an ISO/RTO region/market, and/or even to specific power nodes within regional power markets; these queries may also be further executed alone or in combination with other query elements for access to an even narrower set of data, as long as those other elements are defined and available in the database schema.

As depicted in the exemplary embodiment of FIG. 1, the access unit 33 and the data analysis unit 34 interface with the power and price data stores 21-25 or, more generally, the remote power data sources 20. As opposed to maintaining independent and/or separate connections to each one of the remote power data sources 20, which may also be available locally rather than remotely, and switching between each connection according to whichever data store 21-25 is actively being queried (whether serially or in parallel), the exemplary embodiment maintains the master data store 32 in a manner that eliminates this problem. The master data store 32 may contain stored procedures that are customized for execution against each power and price data store 21-25 (each of which might have different data formats). As a result, any subsequent unit within the system 30 may query the master data store 32, regardless of the power and price data store 21-25 from which information is sought. The master data store's 32 stored procedures may be executed either directly from the master data store 32 against each of the remote power data sources 20, or via the data gathering unit 31; another layer of data abstraction may be added such that the stored procedures are executed neither through the master data store 32 nor the data gathering unit 31, but rather via another unit or DBMS. The master data store 32 of the system 30 may serve as the physical and/or logical single access point to the one or more power and price data stores 21-25. Thus, the access unit 33 and the data analysis unit 34 may maintain one connection to the master data store 32, without the need for maintaining multiple and/or separate connections to, generally, the remote power data sources 20 or, specifically, each of the power and price data stores 21-25.

As further illustrated in the exemplary embodiment of FIG. 1, the data analysis unit 34 maintains several data flow interfaces/connection with several other units/data store(s). The data analysis unit 34 maintains a data flow interface/connection with the master data store 32, the access unit 33, and the display unit 35. The data gathering unit 32, although not shown in the exemplary embodiment of FIG. 1, may also maintain a data flow interface connection with remote power data sources 20, and/or another data store, in parallel or separate from the master data store 32.

The data analysis unit 34 performs analyses on power data and price data to correlate them individually or in the aggregate with one or more causal factors. It is these analyses and other similar ones that are processed by the data analysis unit 34, verified against a power trader user's 43 access permission(s), and may then be sent via either the access unit 33 or display unit 35 to the power trader access unit 41. The transmission of the results of these analyses, and similar ones, may be performed directly, or over a LAN or WAN 60 (whether wired or wireless). Once transmitted to the one or more power trader access units 41 and to the power trader user(s) 43 in one or more power trading markets 40, the results may then be displayed over a processing/display device 42 like a laptop, PDA, mobile telephone, or other similar processing/display device, capable of running a power trader access unit 41 and/or capable of receiving the results from the access unit 33 or display unit 35. A power trader access unit 41 may be an internet browser like those offered by Microsoft, Netscape, or Mozilla (e.g., Internet Explorer™, Navigator™, Firefox™), a standalone application, or may be a port capable of sending and receiving data, whether that port be a direct-connection type port, or a network-connection type port. In accordance with the exemplary embodiment of FIG. 1, the access unit 33 first receives signals from the one or more power trader access units 41 and determines whether the power trader 43 may or may not be provided access to the features of the system 30. Whether the power trader 43 or remote user is granted access or not, the power trader 43 or remote user receives the appropriate access signals sent from the access unit 33 and received by the power trader access unit 41. Similarly, the display unit 35 also transmits the appropriate display signals, often through the access unit 33 and then to the power trading access unit 41, according to whether the power trader is granted access or not. The power trader 43 or remote user subsequently learns of a permission status via the specific processing/display device 42 or other remote user device that might be used. The specific implementation and connection of the power trader access unit 41, with the units in the system 30, will be understood by one of ordinary skill in the art as not limiting the scope of the features embodied by the unit, or those it may interface with.

Further, as illustrated in the exemplary embodiment of FIG. 1, the data flow interface/connection that the data analysis unit 34 maintains with the master data store 32 acts as a source data stream from which the commonly formatted power and price data, which results from the operation(s) of the data gathering unit 31, is received. Once received, the commonly formatted power and price data (including LMP data), is analyzed according to data processing algorithms that correlate the commonly formatted power and price data with LMP data for identifying causal factors. These causal factors include, but are not limited to, the following type(s) of power data: power usage, congestion, weather-related conditions (e.g., temperature, dew point, and/or relative humidity), transmission outages, peak power data, off-peak power data, binding constraints, fuel price(s), and/or time zone. The correlation operation(s) that are performed by the algorithms may be performed on one or more ISO/RTO regions/markets, which may further include many regions and, for example, hundreds or thousands of power nodes, or the correlation may be performed on a narrower set of data like that of one or a couple of nodes; either range of processing is fully supported by the data analysis unit 34 and its algorithms. Through the execution of the data analysis unit 34 and its algorithmically determined correlations, power traders 43 in one or more power trading markets 40 are able to execute power trades, as well as develop similar power trading strategies, with the important advantage of realizing the causal factors or cause-and-effect scenarios that correspond to specific conditions in ISO/RTO regions/markets, and/or power nodes. Moreover, as described below in more detail and illustrated in the exemplary embodiments of FIGS. 2-11, through the execution of the data analysis unit 34 and its algorithmically determined correlations, power traders 43 in one or more power trading markets 40 are further presented with a variety of options/tools for selecting the various ways to customize their queries and to receive the corresponding results through several kinds of reports. Thus, the system 30 operating as a whole offers a very dynamic, customized, power trader-friendly environment, while concurrently managing uncommonly formatted data from the remote power data sources 20, and executing algorithms to aid the user in identifying cause-and-effect scenarios.

Power traders 43 in one or more power trading markets 40 are capable of accessing several features through the power trader access unit 41 as it interfaces with the access unit 33 and/or the display unit 35. The features are specifically aimed at customizing queries against the master data store 32, selecting one of several types of features for customizing the queries, and receiving several kinds of reports for display via the power trader access unit 41 and a processing/display device 42.

The features for customizing queries and the kinds of reports are embodied in FIGS. 2-11. Moreover, the features may be categorized into the following types: price reporting, chart analysis, and price-look back. First, the price reporting feature, which is implemented by the price reporting unit, generates one or more price summary reports according to user-selected filter criteria. Second, the chart analysis feature, which is implemented by the chart analysis unit, compares one or more of the common format power data and price data (including LMP data), as well as the correlated data, including causal factor(s) data, according to user-selected filter criteria. Third, the price look-back feature, which is implemented by a price look-back unit, retrieves and analyzes certain of the common format power data and price data, including LMP data, as well as the correlated data (including causal factor(s) data), according to user-selected look-back criteria, and generates one or more price look-back reports.

Figure 2:
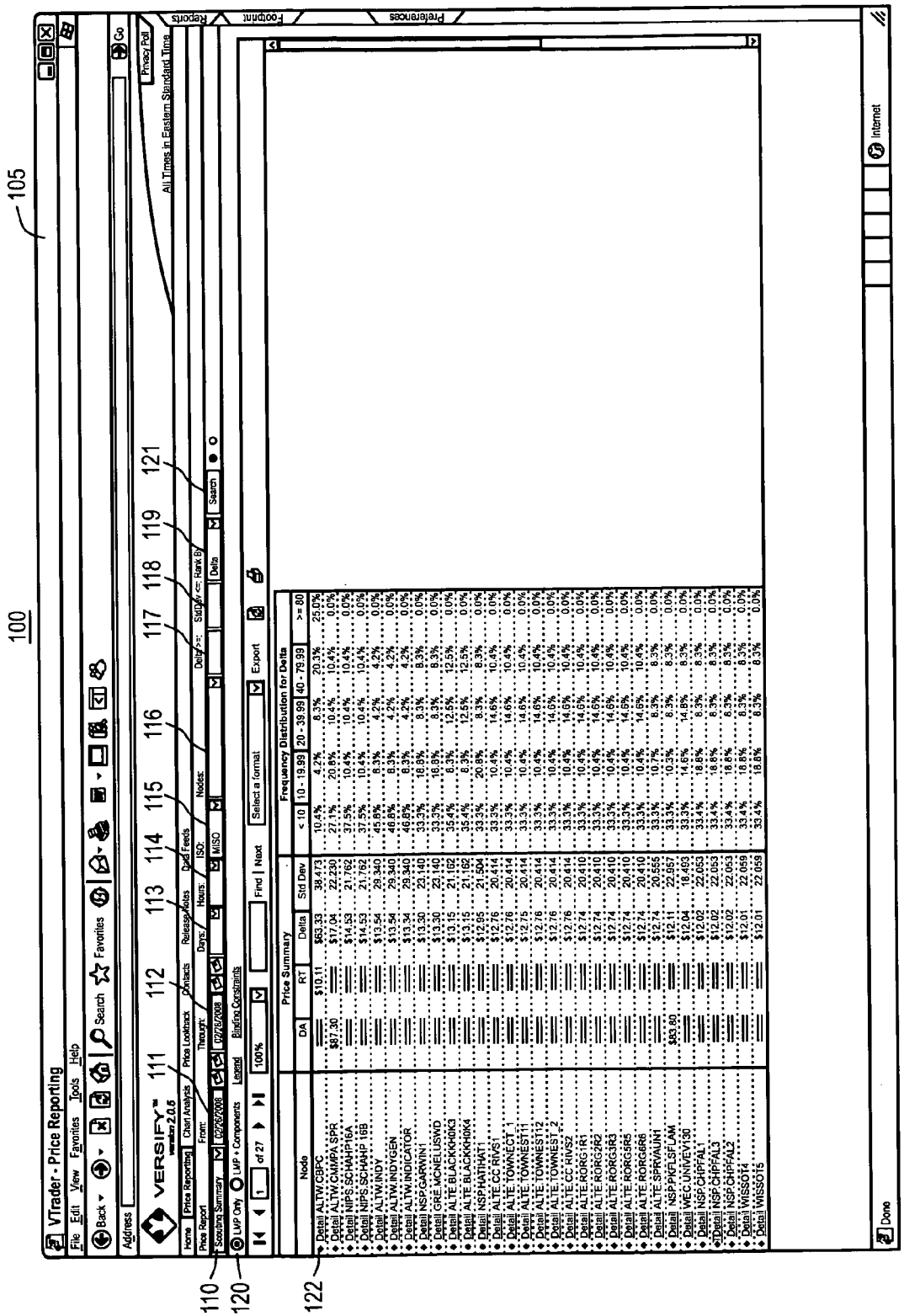
FIG. 2 illustrates an exemplary embodiment of the price reporting unit over a power user access interface.
Figure 2A:
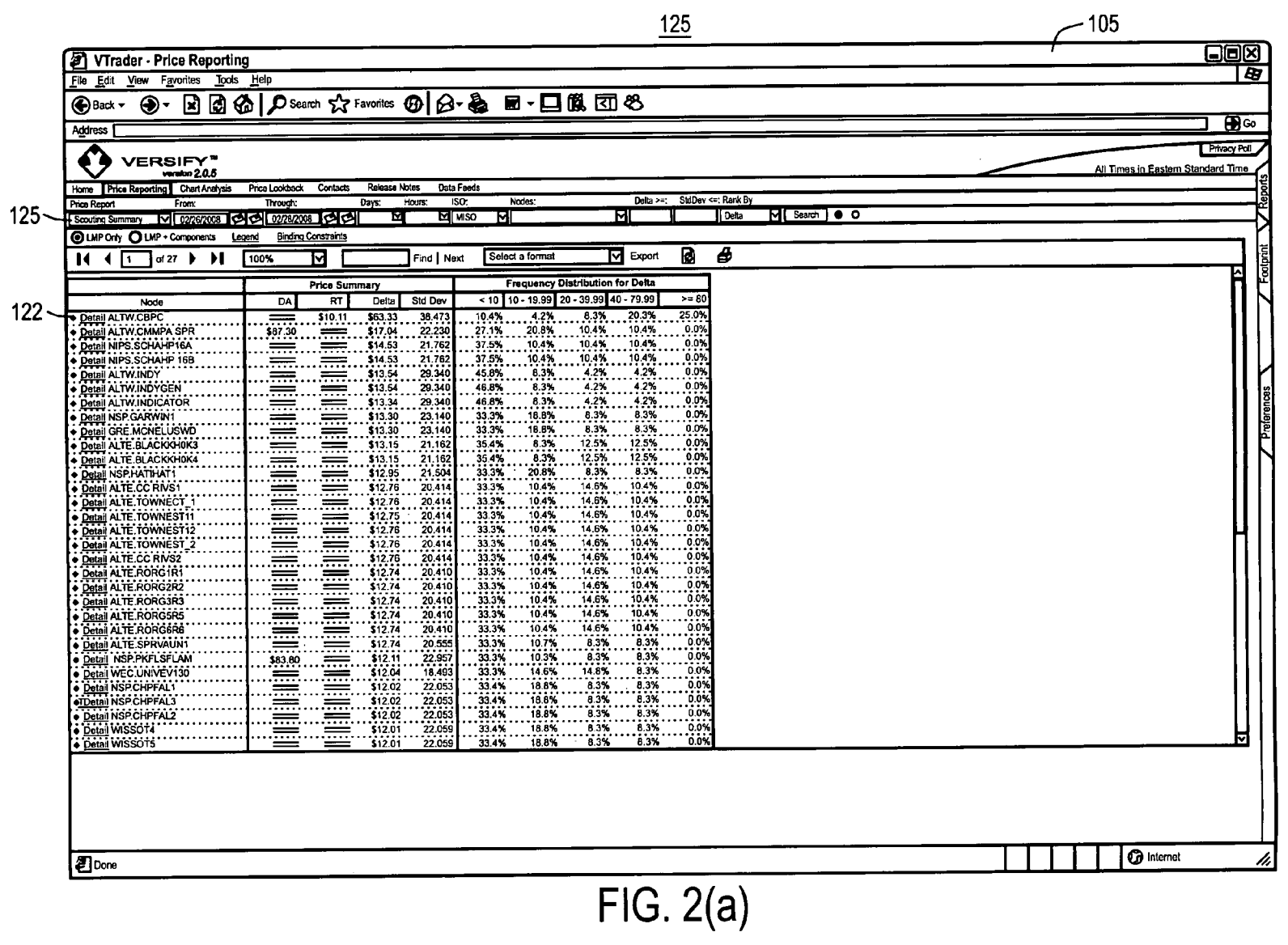
Figure 2B:
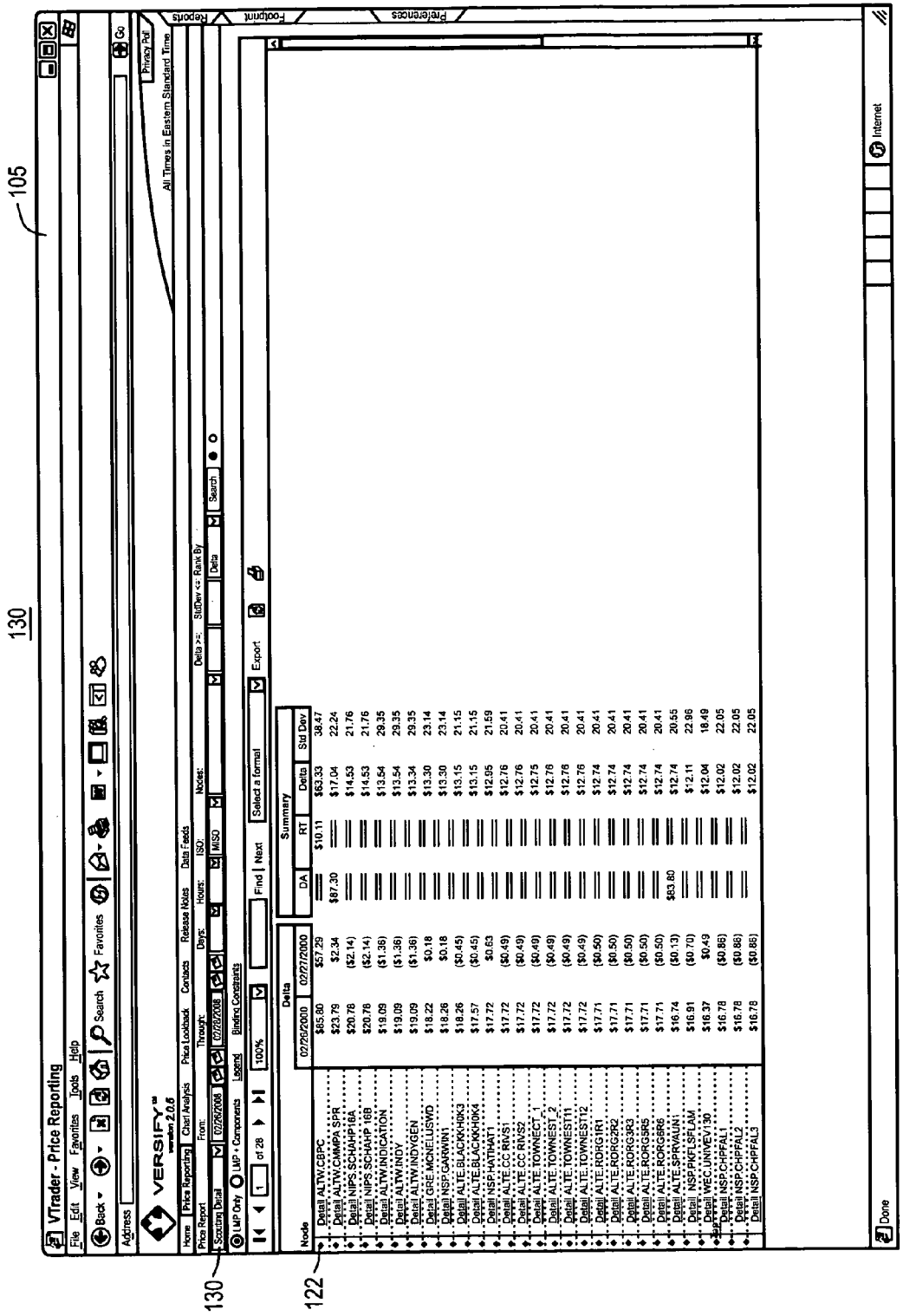
FIGS. 2(a)-(o) illustrate various exemplary embodiments of the price report types over a power user access interface.
Figure 2C:
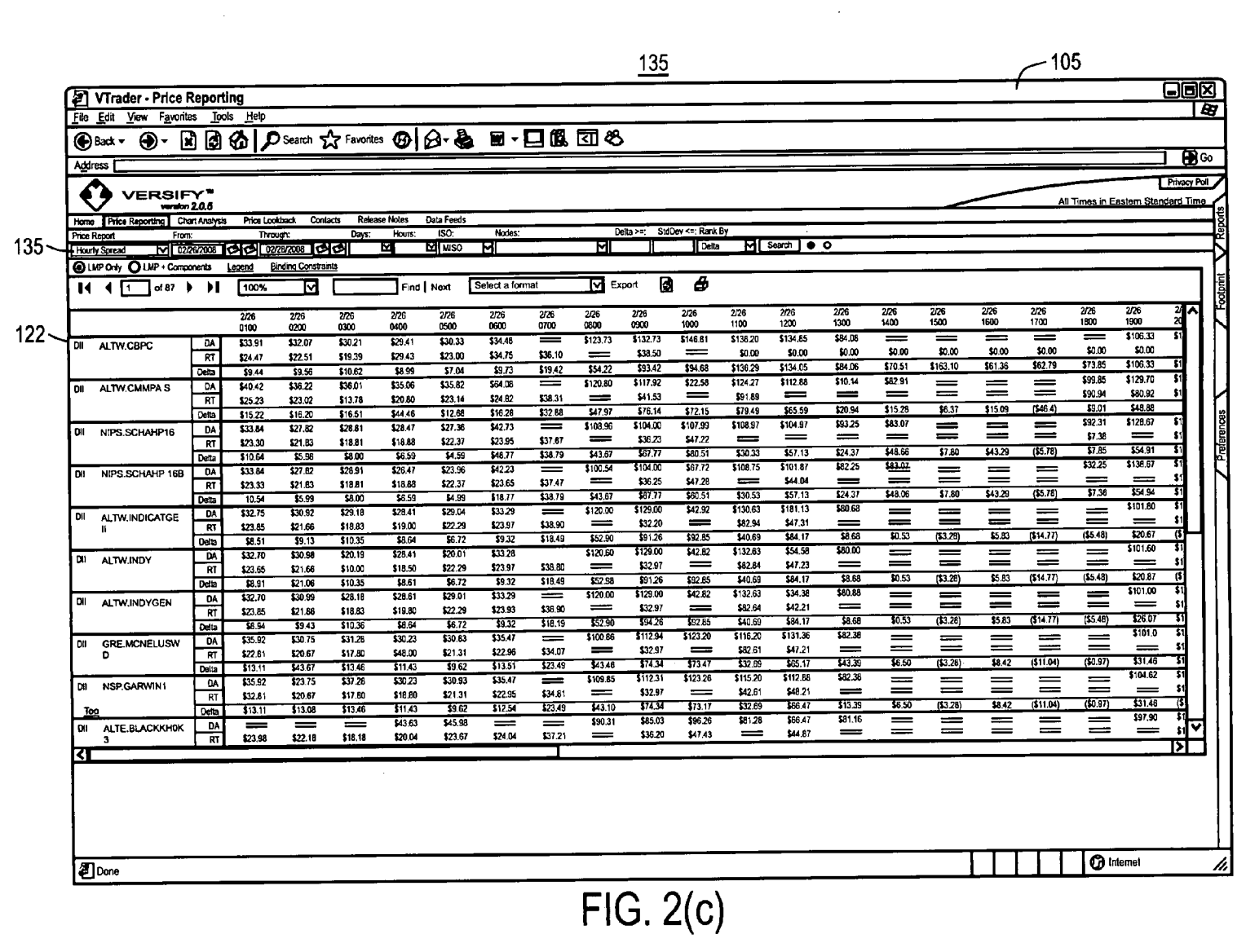
Figure 2D:
Figure 2E:
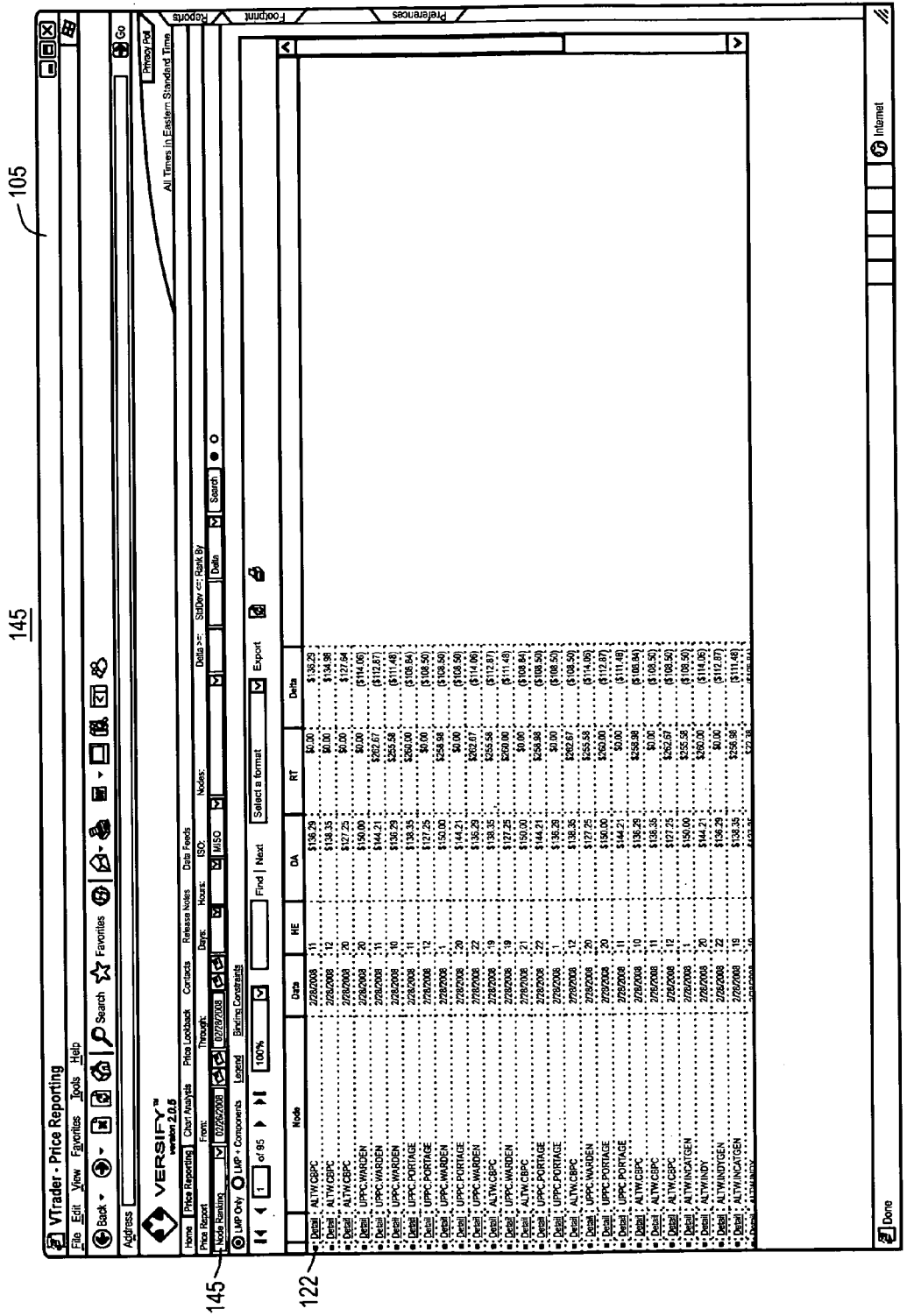
Figure 2F:
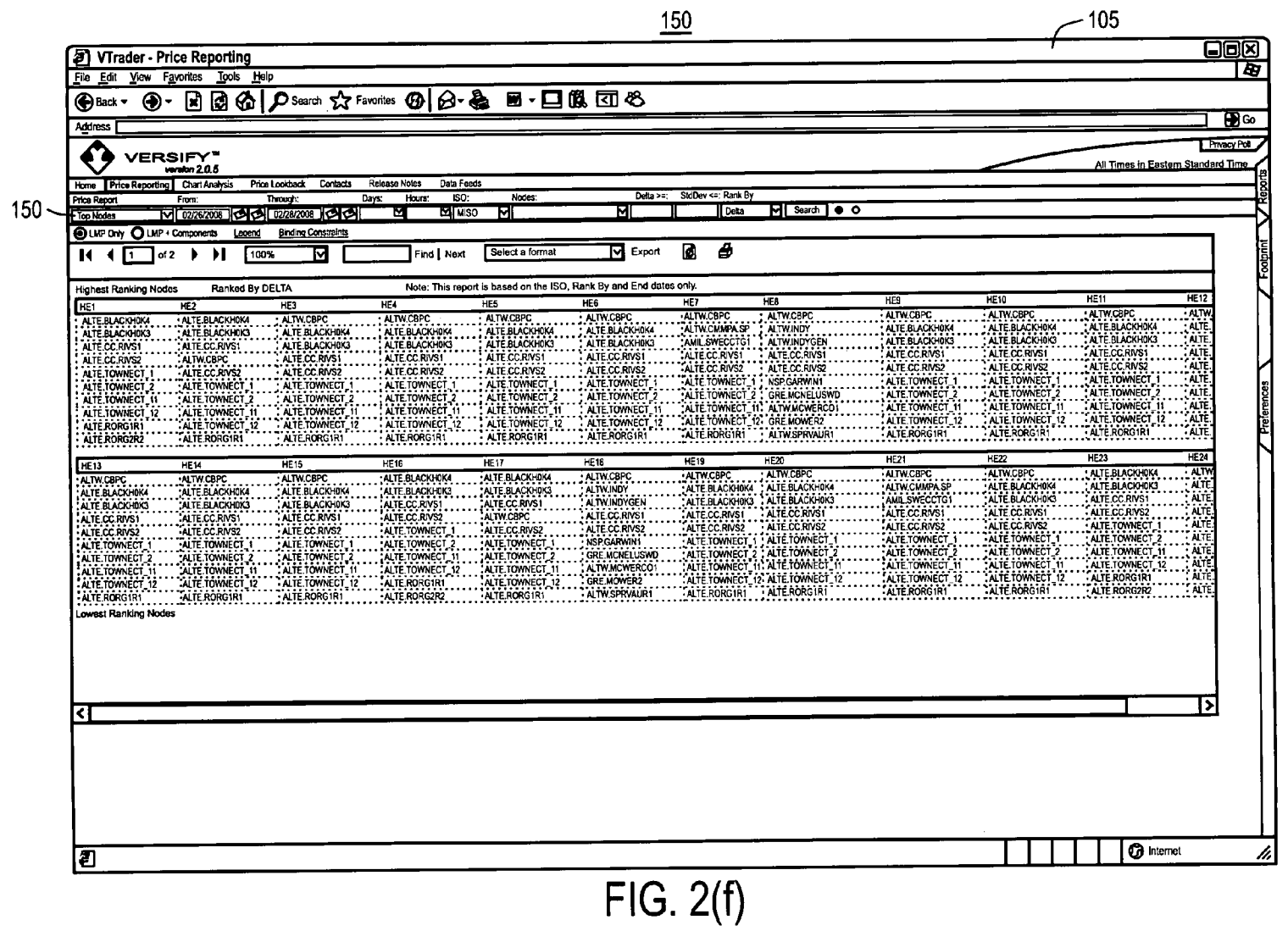
Figure 2G:
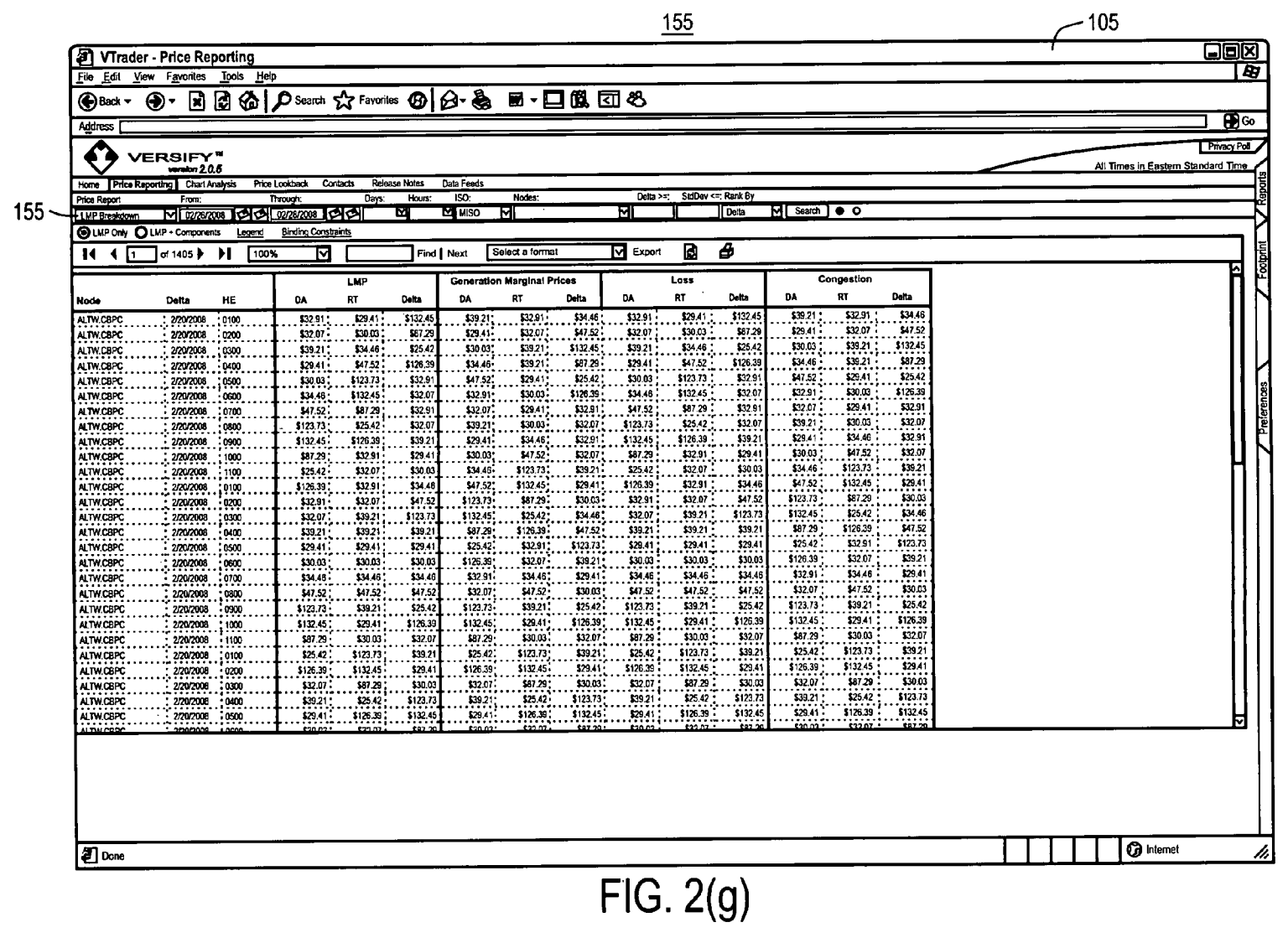
Figure 2H:
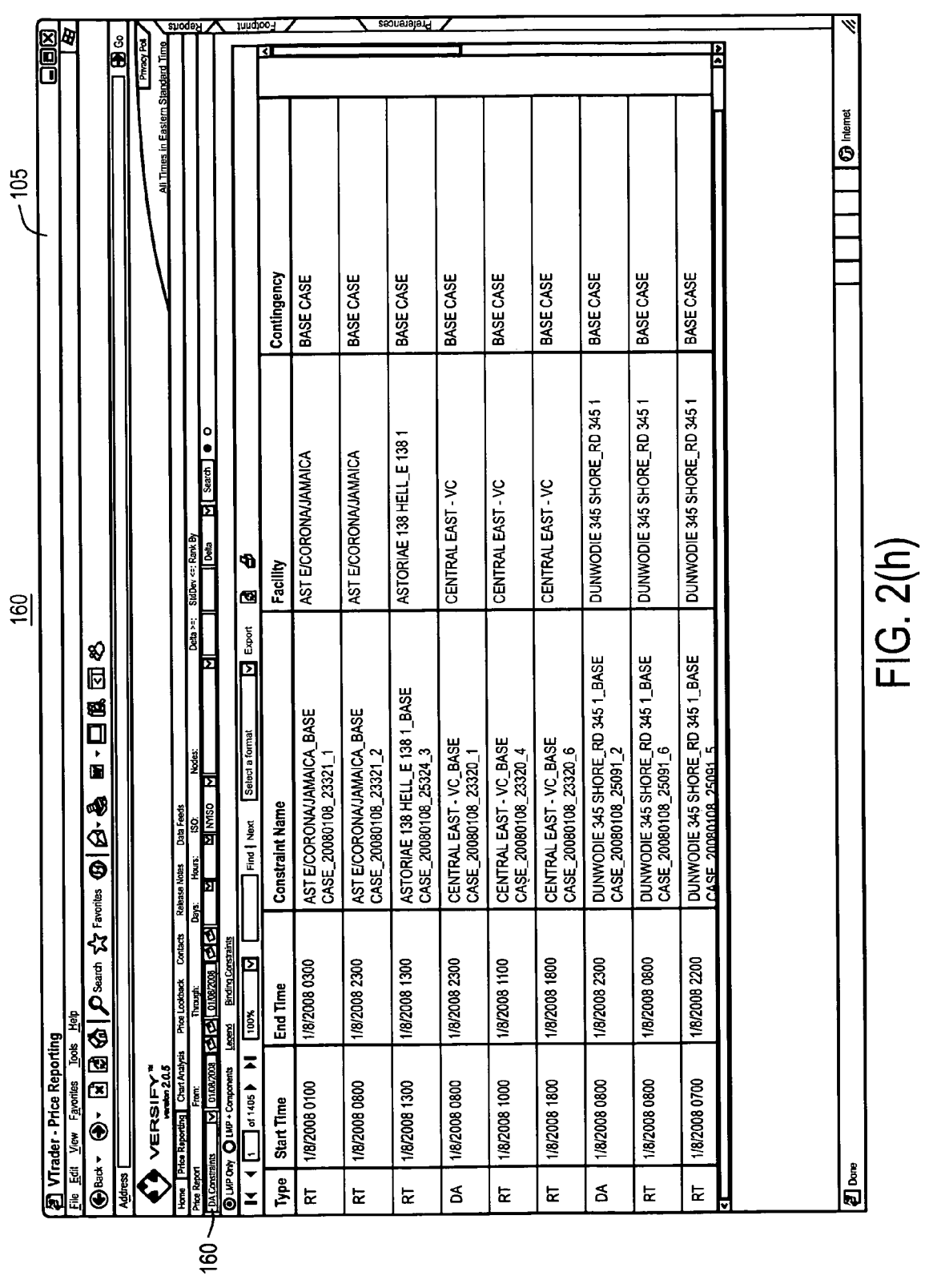
Figure 2J:
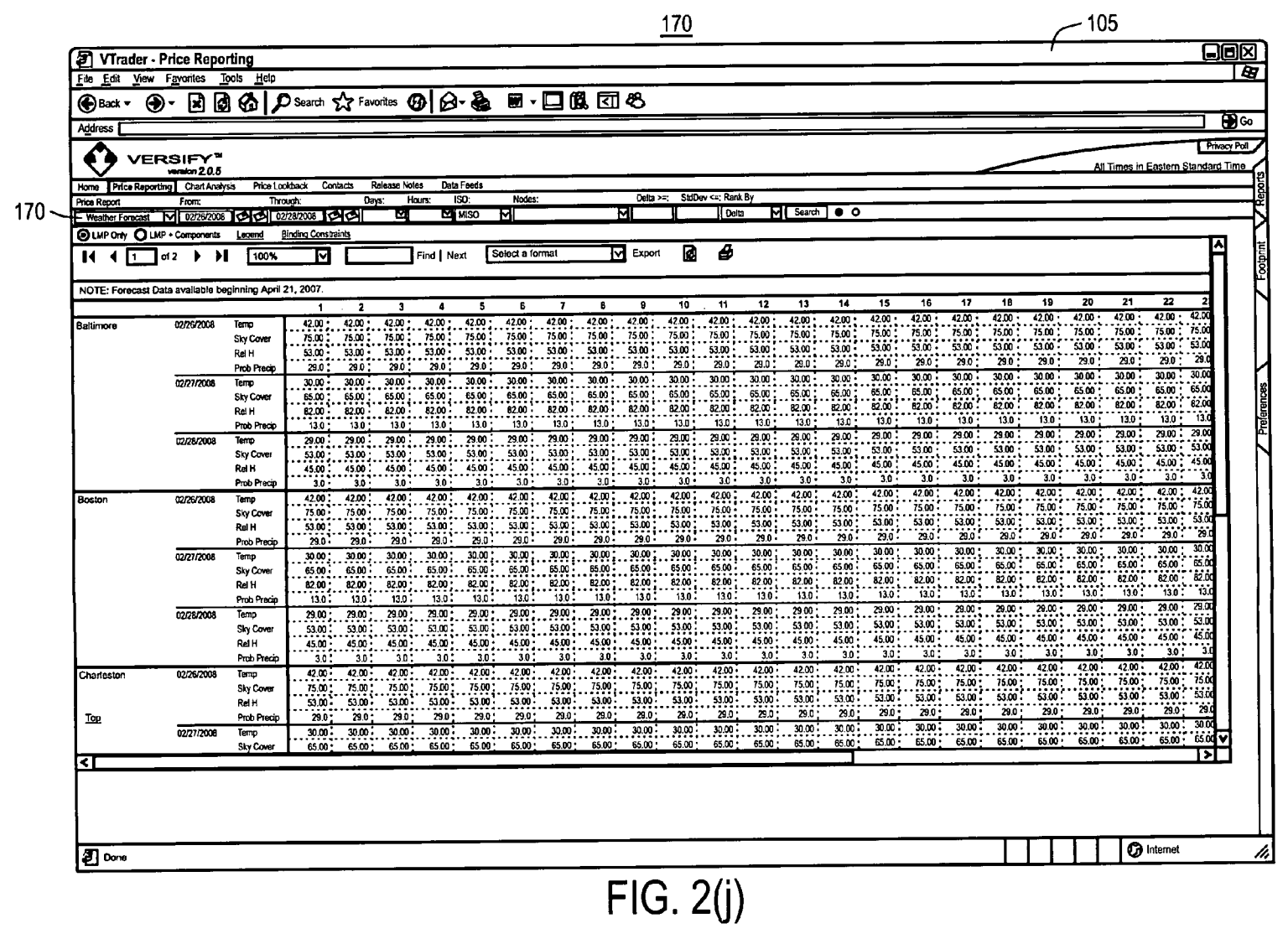
Figure 2K:
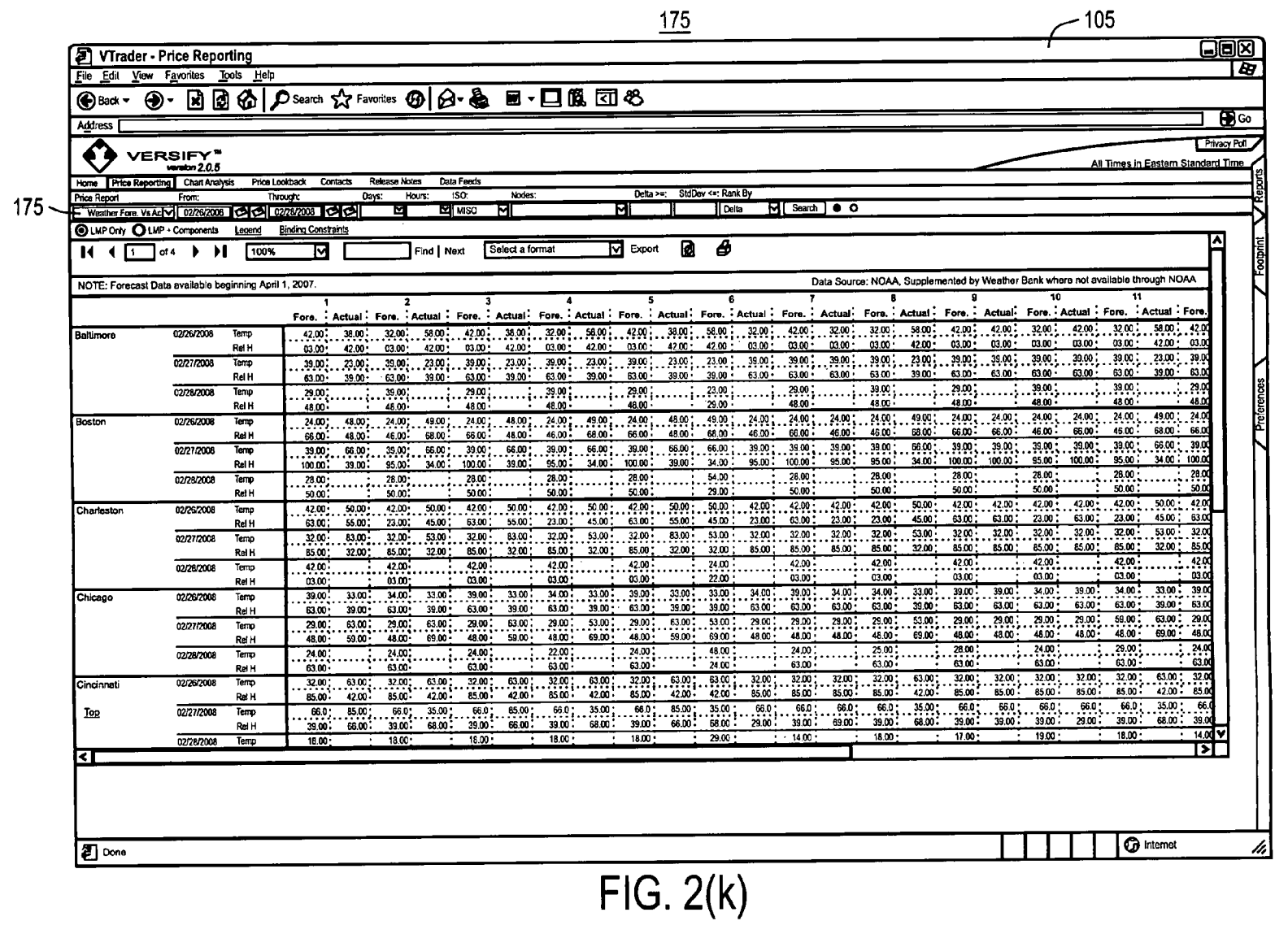
Figure 2I:
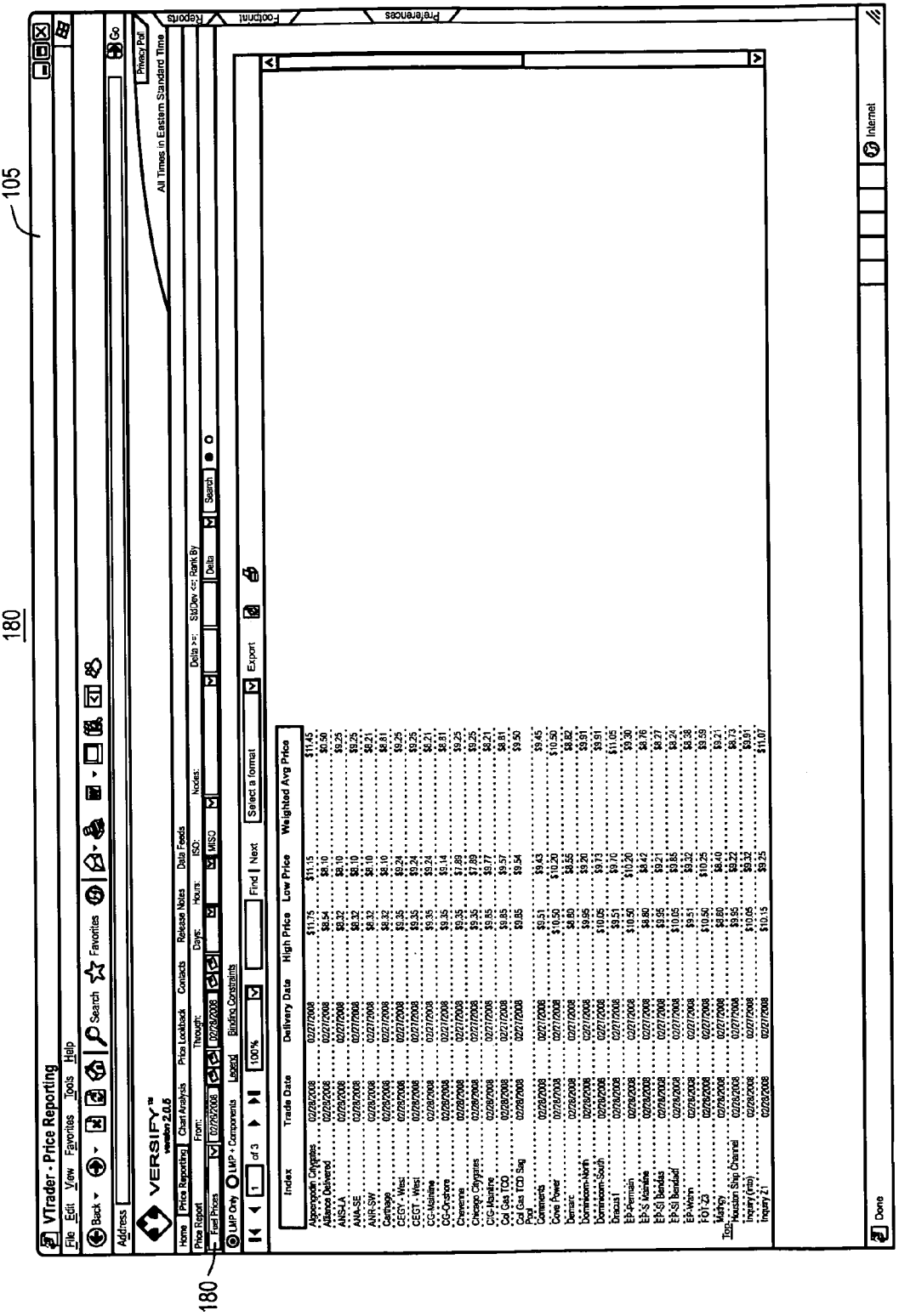
Figure 2M:
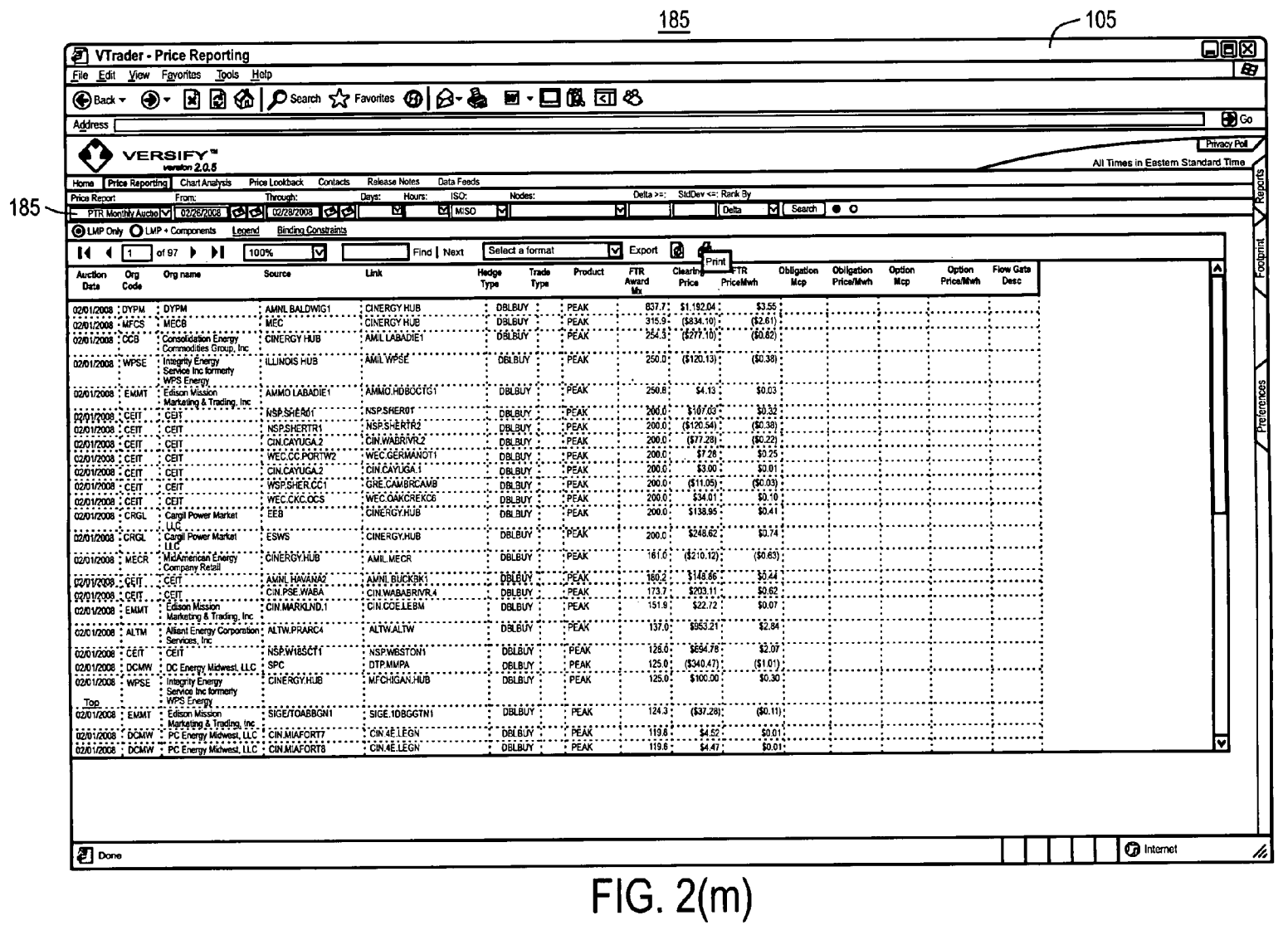
Figure 2N:
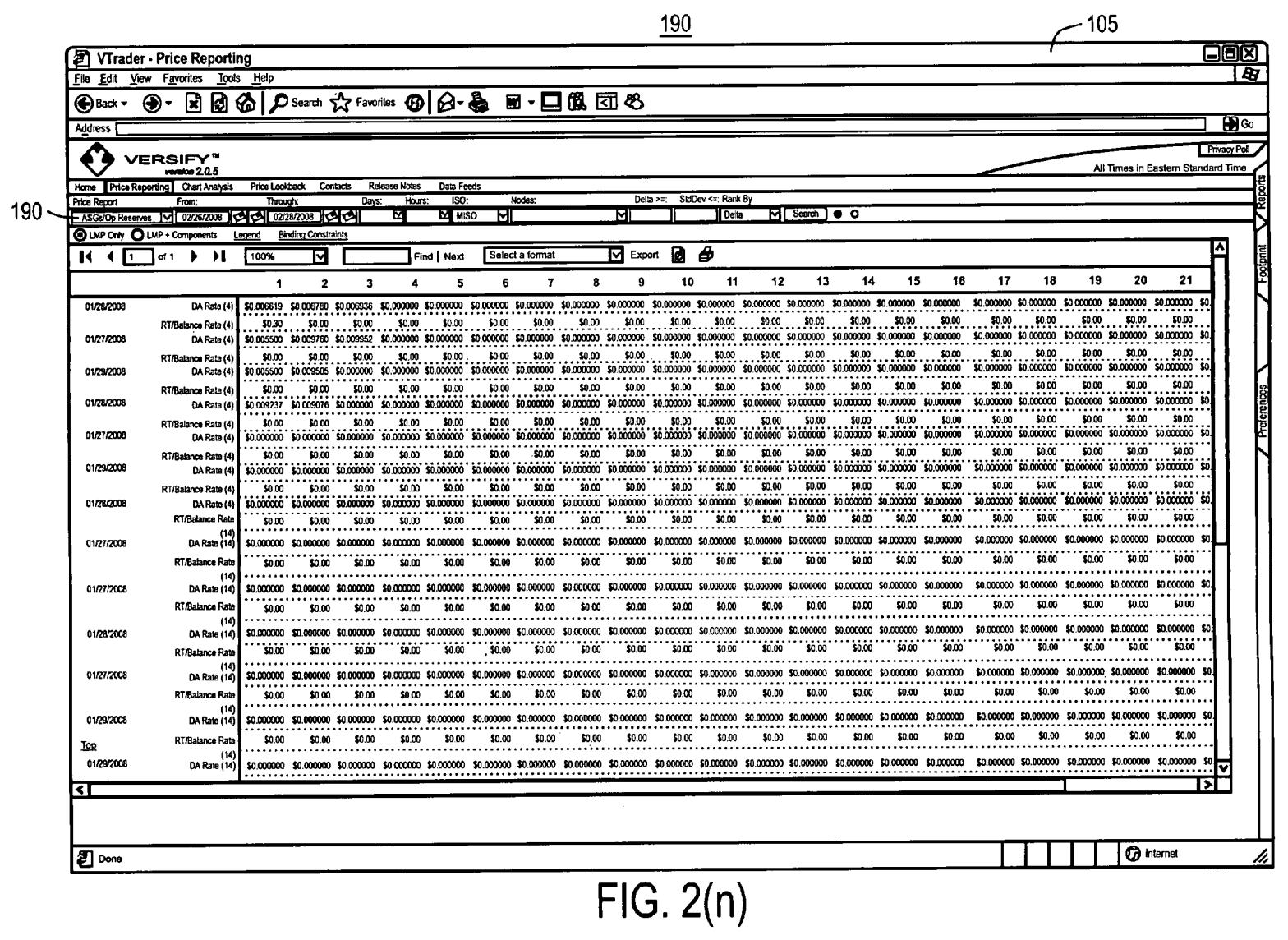

FIG. 2 is an exemplary embodiment of a price summary report 100 of the price reporting feature, over a power user access interface 105. As illustrated in FIG. 2, the price summary report 100 is comprised of a plurality of filter criteria that may be selected by a power trader user 43. The filter criteria permit a power trader user 43 to customize the price summary report 100 such that the user can view the most relevant cause-and-effect scenarios for the user's trading strategies. The filter criteria include, but are not limited to, the following: a price report type 110, a start date 111, an end date 112, a day type 113, a hour type 114, an independent system operator (ISO) type 115, a node type 116, a delta value 117, a standard deviation value 118, a rank-by value 119, and an LMP type 120. One or many of the filter criteria may be chosen. Further, the price report type 110 includes, but is not limited to, the following report types: scouting summary 125, scouting detail 130, hourly spread 135, hourly averages 140, node ranking 145, top nodes 150, LMP breakdown 155, day ahead (DA) constraints 160, constraint frequency 165, weather forecast 170, weather forecast versus actual forecast 175, fuel prices 180, financial transmission rights (FTR) monthly auction 185, RSG/OP reserves 190, and transmission outages 195. Once selected by the power trader user 43, and either an executable button like the search button 121 is invoked or automatic execution occurs, the filter criteria is/are sent to the price reporting unit for processing by the appropriate data analysis unit 34 algorithm(s). Subsequent to the algorithm's(s') processing of the appropriate commonly formatted power and price data with LMP data, including causal factors, and the selected filter criteria, the resulting data is sent from the price reporting unit to either the access unit 33 and/or display unit 35 for subsequent transmission to the power trader access unit 41 and a processing/display device 42. Then, at that time or at a later point in time the power trader 43 may read and analyze the displayed resulting data in order to determine and/or analyze prospective power trades and power trading strategies according to the resulting data. In addition, the resulting data is displayed to the power trader 43 based on the selected price report type 110, each of which may display a different set and/or subset(s) of the resulting data. Each power trader 43, based on user preference(s), may freely choose the price report type 110 that best suits preferred power trading needs and strategies. Moreover, the same price report may show anything, for example, from a price for a given hour averaged over a specific timeframe, to all of the prices averaged over the same timeframe.

An exemplary embodiment of each of the price report types, listed above, is illustrated in FIGS. 2(*a*)-(*o*), respectively. Many of the price report types (like, for example, scouting summary 125, as shown in FIG. 2(*a*)) also contain a "drill-down" feature 122 that may, for example, provide hourly detail power and price data about a specific power node.

Figure 3:
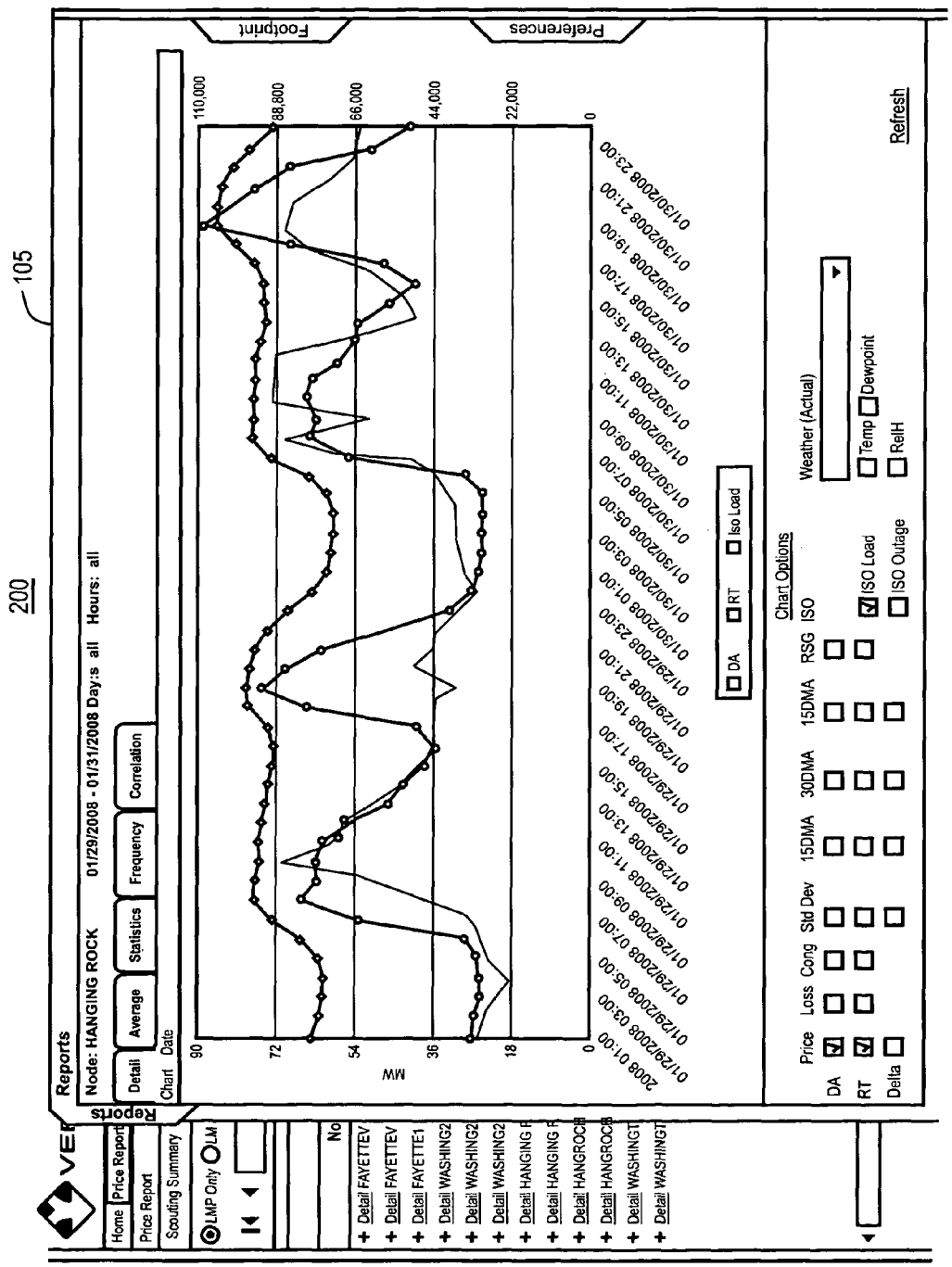
FIG. 3 illustrates an exemplary embodiment of the DA, RT, and load details power node report interface.

FIG. 3 illustrates an exemplary embodiment of the DA, RT, and load details power node report 200, over a power user access interface 105. This report is the first of several types of reports, which are illustrated in FIGS. 4-7 (described below), that allow power trader users 43 to quickly navigate from the more general price report types (described above) to these specific reports with the capability to be able to analyze finite hourly level detail(s). For example, these reports are capable of displaying data that may be analyzed (in at least graph or tabular format) based on a range as specific as five (5) minute intervals for past and current hours. The report illustrated in FIG. 3 is capable of displaying, for example, hourly level data for a specific, user selected date interval, day(s), and hour(s). Hourly price data is displayed by default both graphically and in tabular format. The user has the capability to change the presented data by selecting from the number of options 205 available like: DA, RT, and Delta. These options 205 are further displayed according to, for example: price, loss, congestion, standard deviation. 15DMA, 30DMA, 45DMA, RSG, ISO Load, ISO Outage, weather locale, temperature, dew point, and relative humidity. Once the data is presented at least based on these default or custom capabilities, for example, via the power trader access unit 41 and a processing/display device 42, the power trader user 43 may view the data to determine cause-and-effect scenarios.

Figure 4:
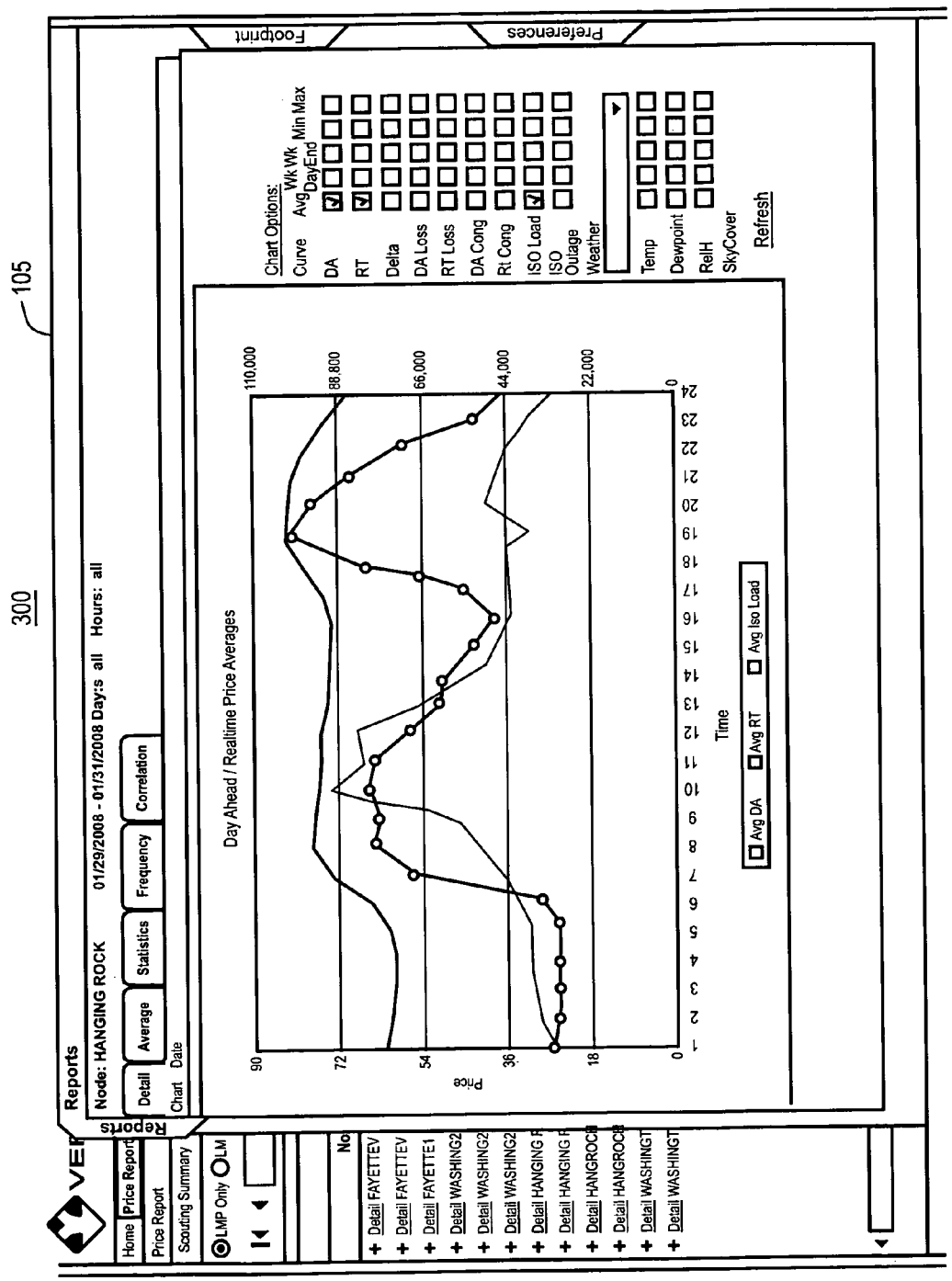
FIG. 4 illustrates an exemplary embodiment of the DA, RT, and load averages power node report interface.

FIG. 4 illustrates an exemplary embodiment of the DA, RT, and load averages power node report 300, over a power user access interface 105. This report shares many of the characteristics that define the details power node report 200. In addition, the report has the capability to present, for example, hourly level data that is averaged for each hour of the day (i.e., he1, he2, . . . he24) over a user selected time interval.

Figure 5:
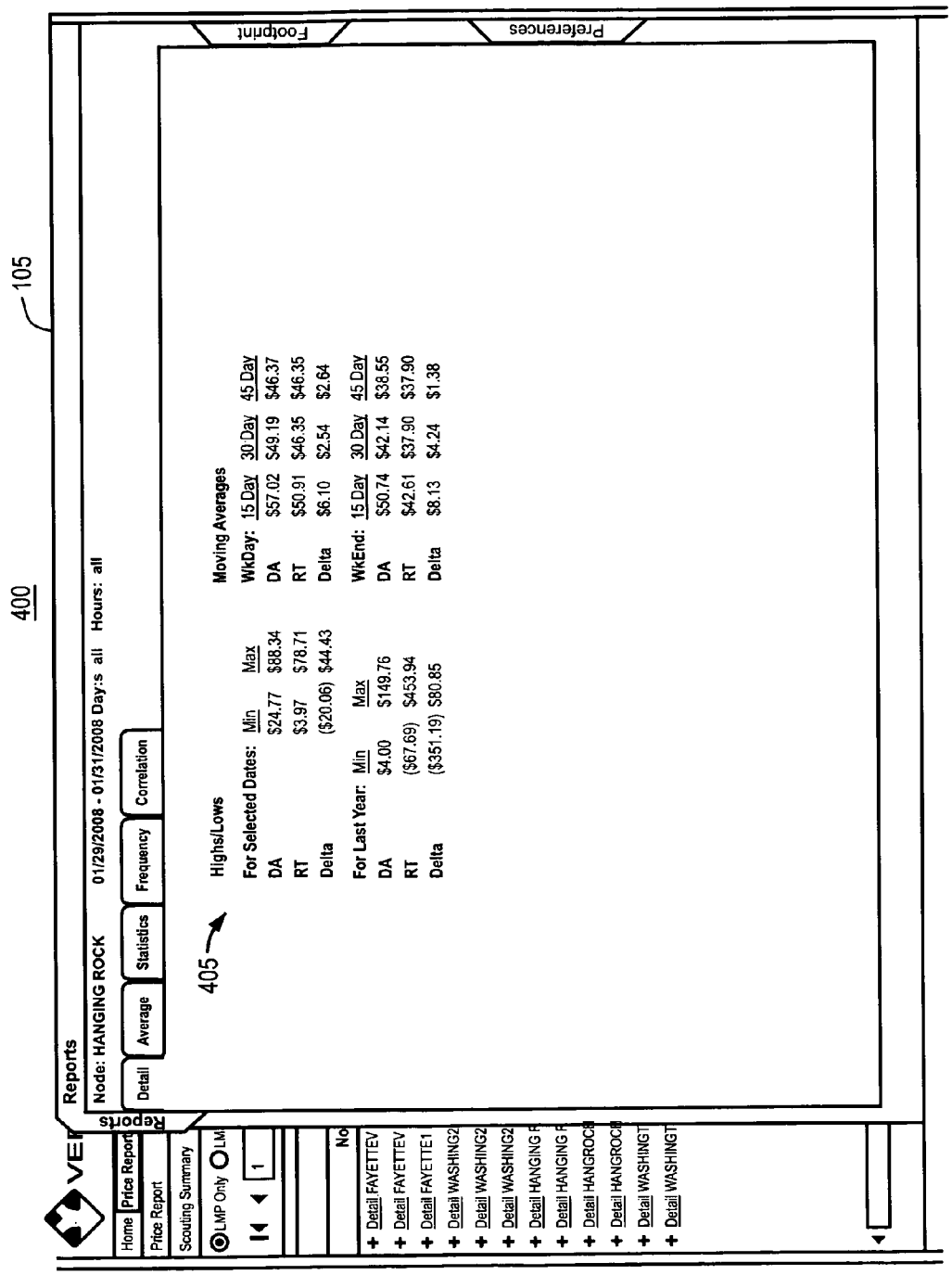
FIG. 5 illustrates an exemplary embodiment of the DA, RT, and load statistics power node report interface.

FIG. 5 illustrates an exemplary embodiment of the DA, RT, and load statistics power node report 400, over a power user access interface 105. This report also shares many of the characteristics that define the details power node report 200. In addition, however, the report has the capability to present, for example, key price statistics 405 over the past one or more years, and/or over a user selected time interval. The report is capable of presenting, for example, the following key price statistics 405: minimum price, maximum price, 15-day average, 30-day average, and 45-day average.

Figure 6:
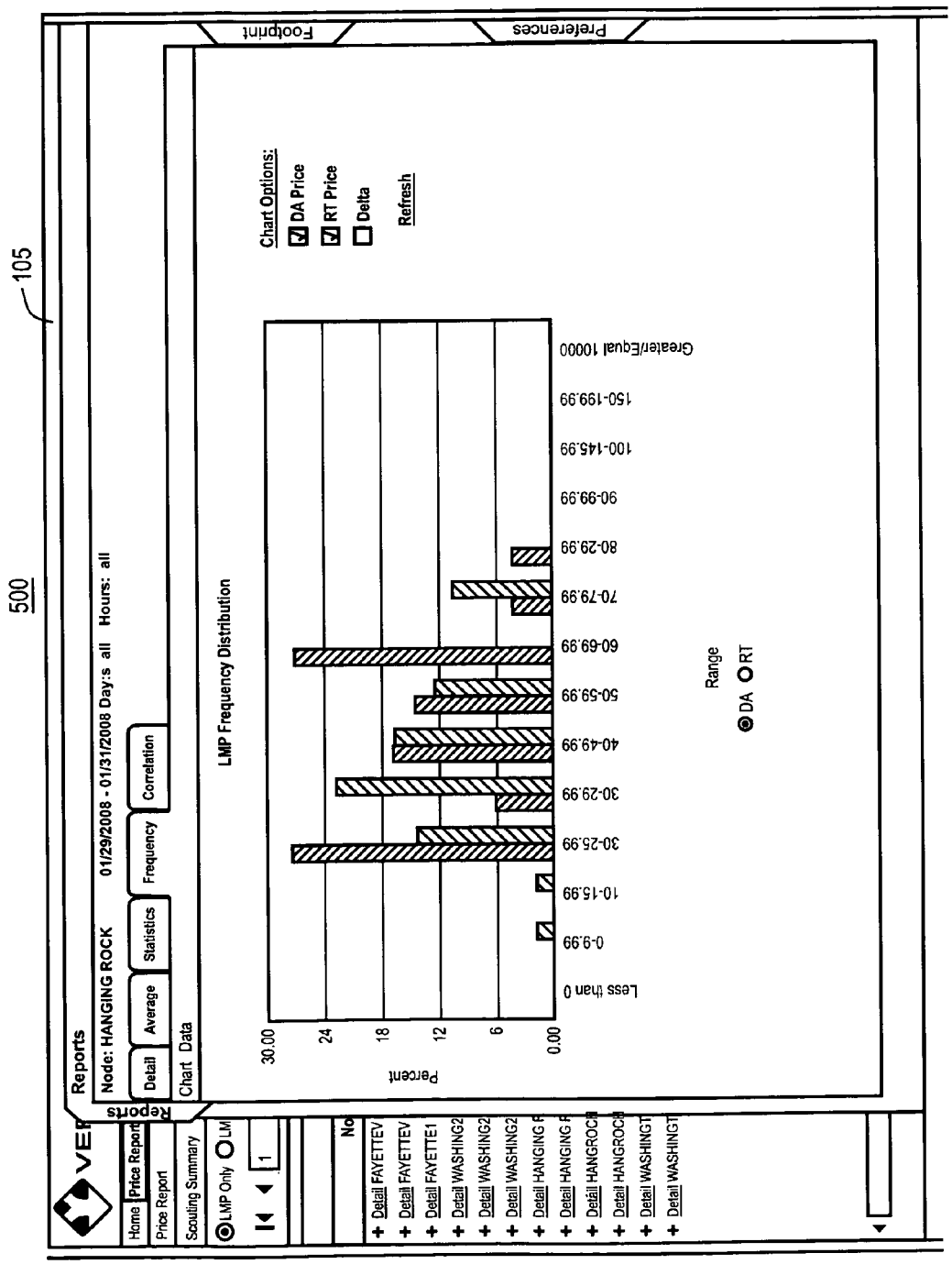
FIG. 6 illustrates an exemplary embodiment of the LMP frequency distribution power node report interface.

FIG. 6 illustrates an exemplary embodiment of the LMP frequency distribution power node report 500, over a power user access interface 105. This report also shares many of the characteristics that define the details power node report 200. In addition, however, the report has the capability to present, for example, the percentage of time that LMP data meets specific price ranges.

Figure 7:
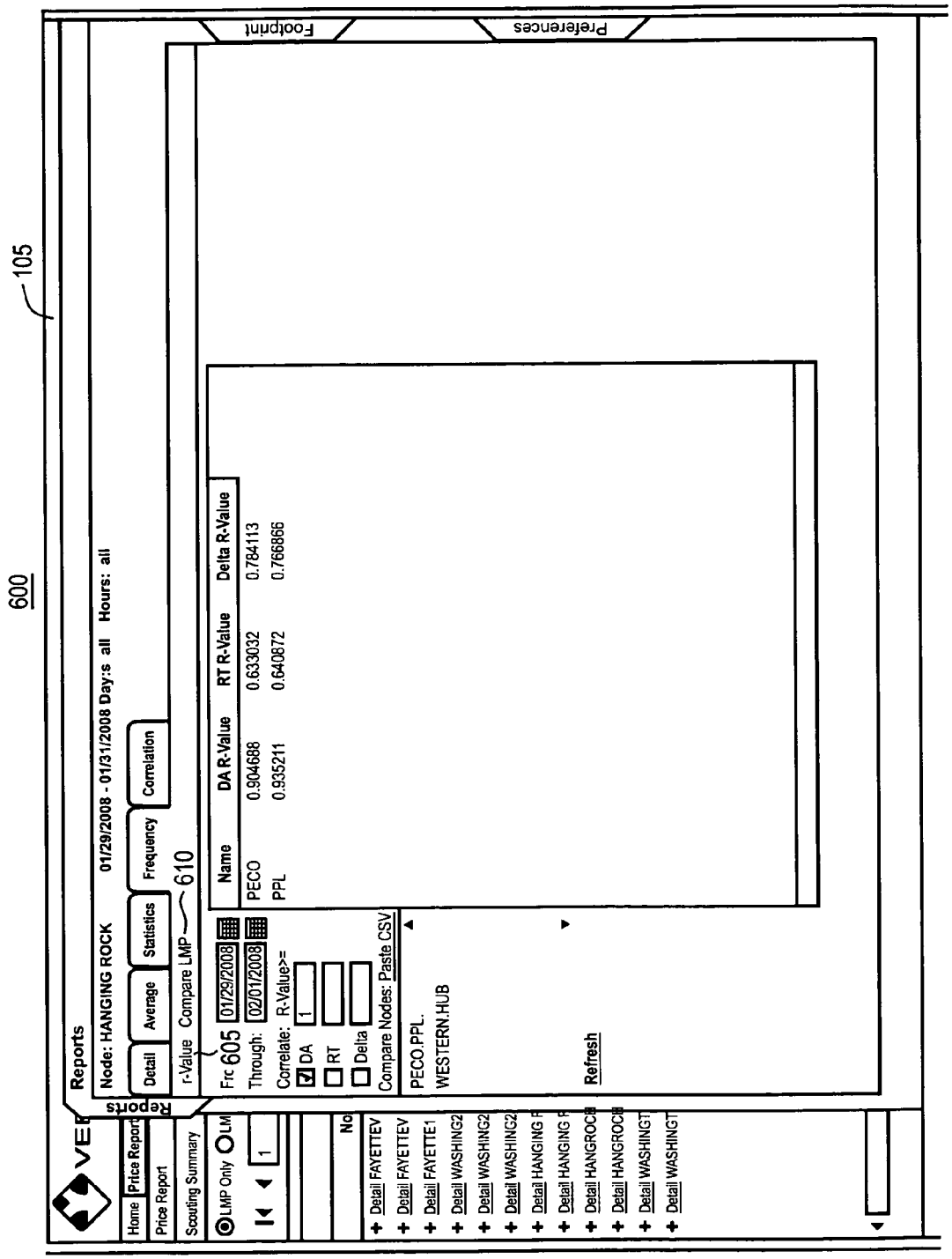
FIG. 7 illustrates an exemplary embodiment of the DA and RT correlation power node report interface.

FIG. 7 illustrates an exemplary embodiment of the DA and RT correlation power node report 600, over a power user access interface 105. This report also shares many of the characteristics that define the details power node report 200. In addition, however, the report has the capability to present, for example, a user-selected comparison of a specific power node against all other power nodes, or a specific subset of power nodes, within an ISO/RTO region market. Moreover, the user is presented with at least two options, one for computing an r-value correlation coefficient 605, and another for comparing an LMP price 610 on an hour-by-hour basis. The computation of an r-value correlation coefficient uses a standard r-value calculation and may be performed by the data analysis unit 34, a stored procedure of the master data store 32, or another unit or data store of the system 30. The r-value correlation coefficient calculations may be used by power trader users 43 to identify power nodes with similar trends, as well as potential hedging opportunities. As for the other option, comparing an LMP price, the comparison is performed between a price for each hour to every other power node, or a specific subset of power nodes, within an ISO/RTO region/market; it may also compute the average difference between them.

Figure 8:
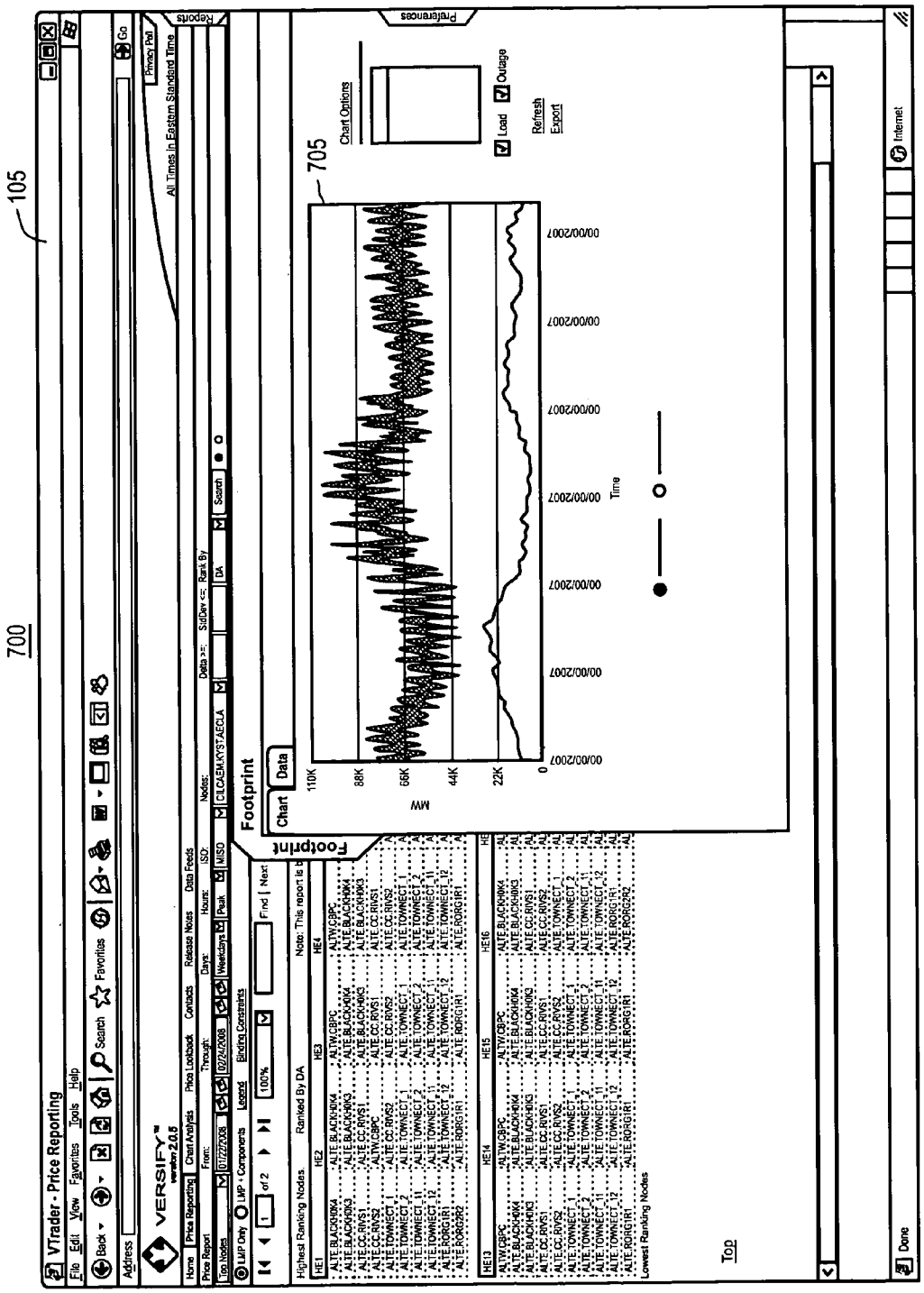
FIG. 8 illustrates an exemplary embodiment of the ISO footprint report interface.

FIG. 8 illustrates an exemplary embodiment of the ISO footprint report 700, over a power user access interface 105. This report also shares many of the characteristics that define the details power node report 200. Specifically, this report provides the capability to analyze a specific ISO/RTO region's/market's load data as it compares to outage data 705.

Figure 9:
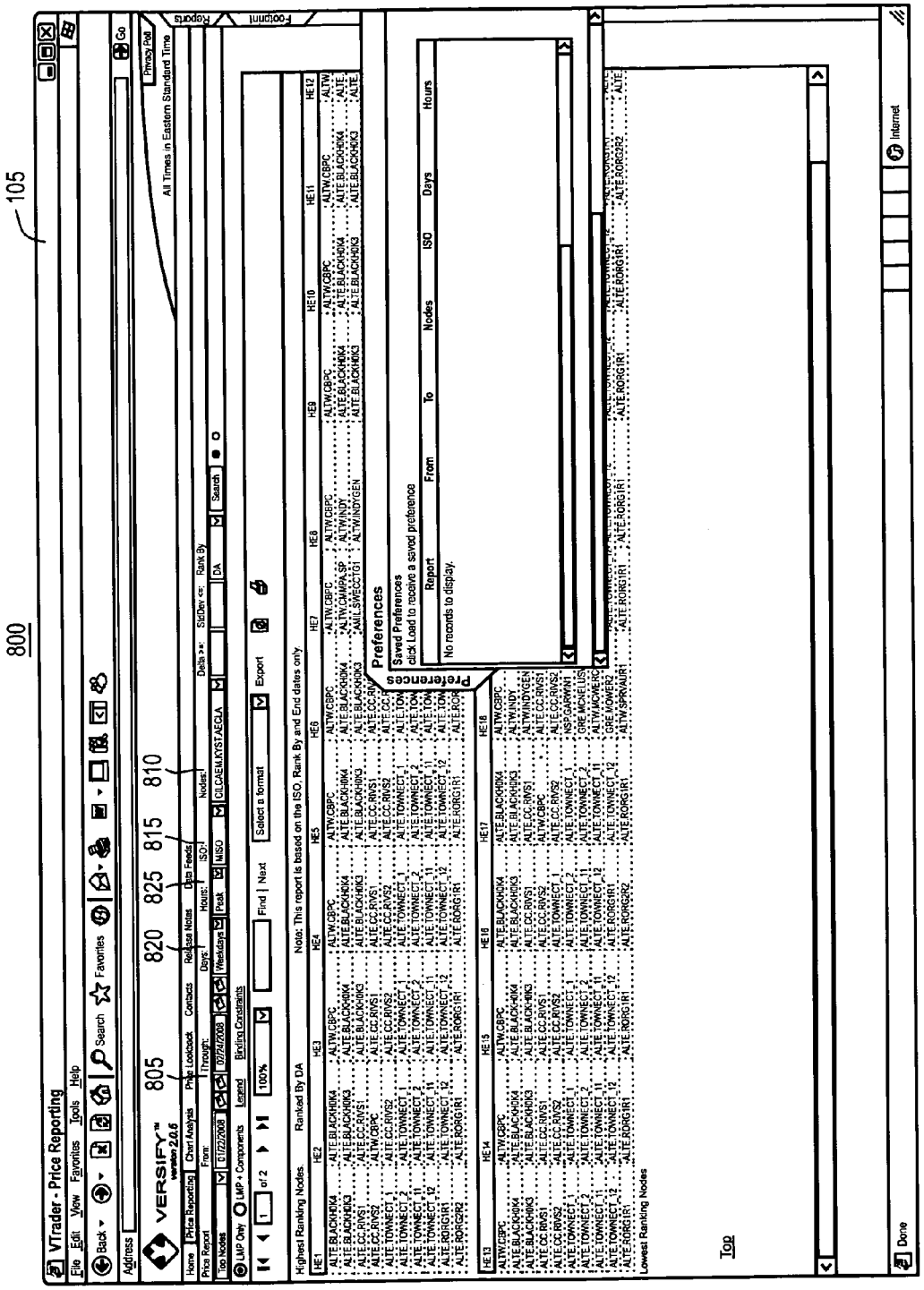
FIG. 9 illustrates an exemplary embodiment of the report preferences unit interface.

FIG. 9 illustrates an exemplary embodiment of the report preferences unit 800, over a power user access interface 105. Specifically, this report provides the capability to set specific report preferences like, for example: from-to date range 805, power node type 810. ISO-RTO type 815, day type 820, and hour(s) type 825. The preferences may be saved by the user and/or loaded from an earlier time when they were saved. In addition, once preferences are saved and/or loaded they may be subsequently reflected in the reports.

Figure 10:
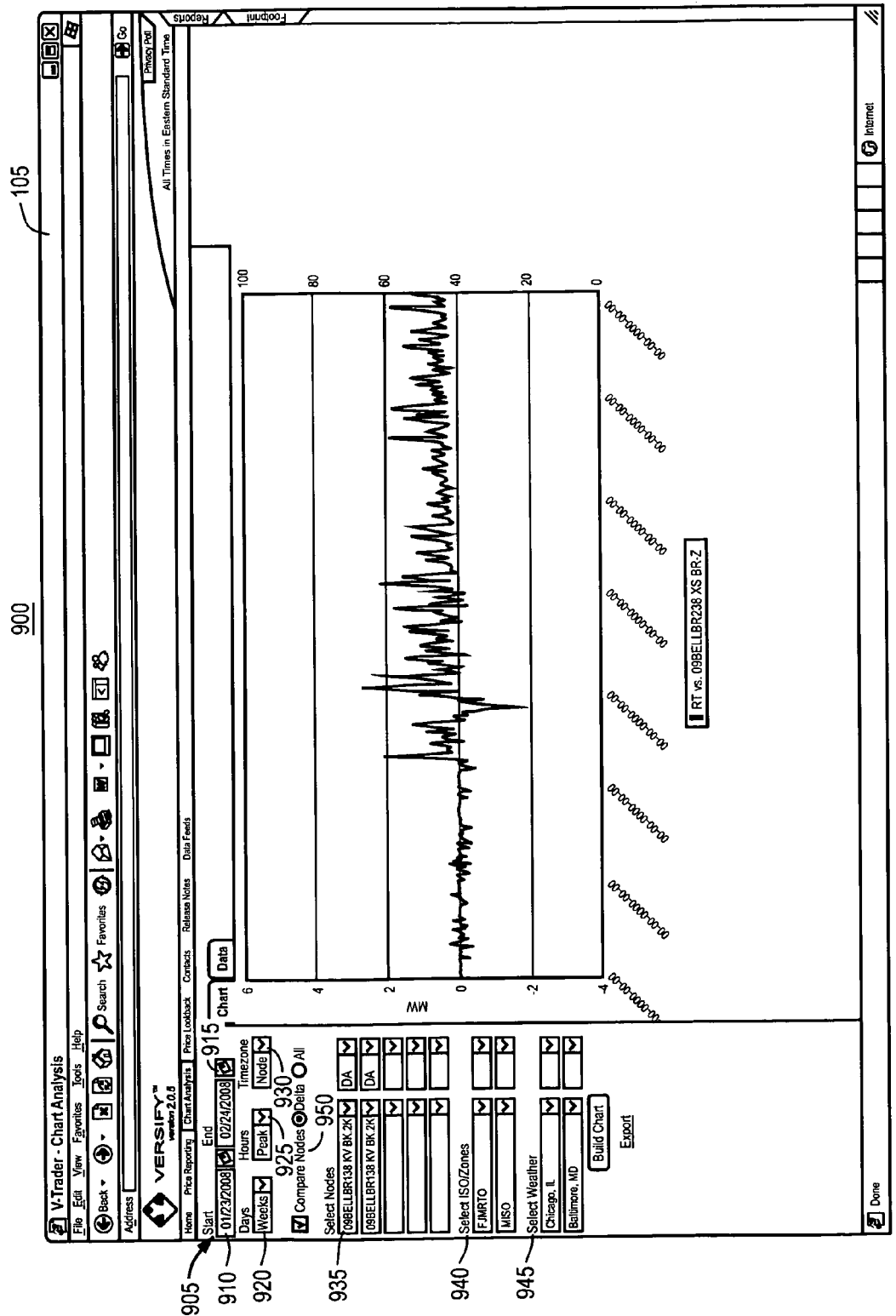
FIG. 10 illustrates an exemplary embodiment of the chart analysis power node report interlace.

FIG. 10 illustrates an exemplary embodiment of a chart analysis power node report 900 of the chart analysis feature, over a power user access interface 105. As illustrated in FIG. 10, the chart analysis report is comprised of a plurality of filter criteria 905 that may be selected by a power trader user 43. The filter criteria 905 permit a power trader user 43 to customize the chart analysis power node report 900 such that user can compare nodes and view the most relevant cause-and-effect scenarios for the trading strategies. The filter criteria generally include common format power data and price data (including LMP data), as well as the correlated data including causal factor(s). Specifically, the filter criteria include, but are not limited to, the following: a start date 910, an end date 915, a day type 920, a hour type 925, a time zone type 930, a plurality of node types 935, a plurality of ISO/zone types 940, a plurality of weather types 945, and a compare nodes type 950. The exemplary embodiment illustrated in FIG. 10 shows that up to five (5) power nodes may be compared simultaneously. In other embodiments, however, the user may be able to select more or less power nodes. Furthermore, users may also choose to include load and outage data, as well as weather conditions data. Again, the exemplary embodiment illustrated in FIG. 10 illustrates that data from up to two (2) ISO/RTO regions/markets could be selected, as well as weather conditions data from up to two (2) cities. In other embodiments, however, the user may be able to select more or less ISO/RTO regions/markets, as well as weather conditions data from more or less cities.

Figure 11:
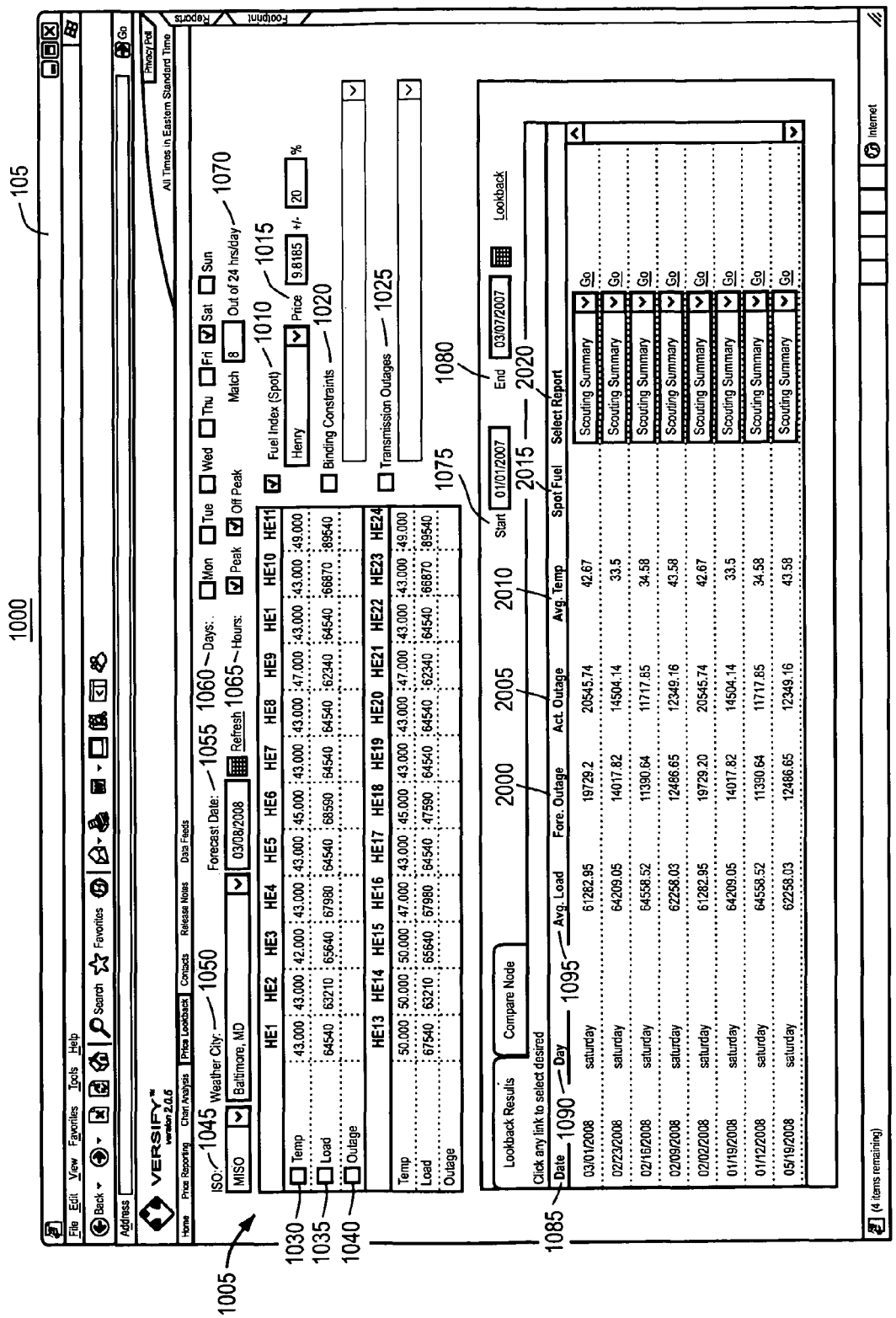
FIG. 11 illustrates an exemplary embodiment of the price look-back report interface.

FIG. 11 illustrates an exemplary embodiment of a price look-back report 1000 of the price look-back feature, over a power user access interface 105. The price look-back feature permits a power trader user 43 to invoke the retrieval and analysis of certain of the common format power data and price data (including LMP data), as well as the correlated data including causal factor(s), according to user-selected look-back criteria, and to generate one or more price look-back reports 1000. As illustrated in FIG. 11, the look-back criteria 1005 include, but are not limited to, for example: fuel index type 1010, fuel index price 1015, constraint type 1020, and transmission outage type 1025. Further, as also illustrated in FIG. 11, the look-back criteria 1005 include, but are not limited to, for example: temperature value 1030, load value 1035, outage value 1040, ISO type 1040, weather type 1050, forecast date 1055, day value 1060, hour type 1065, matching hour value 1070, start date 1075, and end date 1080. Specific tolerance ranges may be selected for one or more of the look-back criteria. Once the user has selected the look-back criteria, and the data is retrieved and analyzed by the price look-back feature, it is passed on to a look-back results unit or displayed directly. The retrieved and analyzed data is that which corresponds to the specific criteria selected; the data may be for corresponding days, other time frames, or based on one or more other metrics. The look-back results unit implements a look-back results feature that displays the retrieved and analyzed data according to, for example, one or more of the following criteria: date value 1085, day value 1090, average load forecast value 1095, outage value 2000, actual outage value 2005, average temperature value 2010, spot fuel value 2015, and price report type 2020. At this point in time, the user may invoke the price reporting feature on certain of the retrieved and analyzed data displayed by the look-back results feature. The user may also retrieve LMP data for specific power nodes for the retrieved and analyzed data. If the user invokes the price reporting feature, the user may then also choose one or more of the price report types 110 (discussed above) and generate one or more price summary reports, accordingly. In addition to, or instead of, invoking the price reporting feature on certain of the retrieved and analyzed data displayed by the look-back results feature, the user may also choose to invoke the compare node feature, which is implemented by the compare node unit, in order to compare one or more specific power nodes to the retrieved and displayed data.

The features and capabilities of the price look-back feature, as well as some of the other features of the exemplary embodiment, provide power trader users 43 with powerful tools to at least retrieve and analyze the most proper and accurate historical power and price data, which serve as a reliable indicator for today's power prices and market performance. In addition, power trader users 43 are also able to at least analyze accurate cause-and-effect scenarios that permit the traders to make confident, informed trades, as well as to develop successful power market trading strategies.

FIG. 12 illustrates an exemplary embodiment of a five-minute ticker report 1100 interface, over a power user access interface 105. As illustrated in FIG. 12, the five-minute ticker report may comprise price node summary charts 1105, 1110. The five-minute ticker report is a user-customizable report that provides power trader users 43 with the ability to identify a list of nodes 1135 for which they would like to track data such as average RT price 1140 and DA price 1145, according to, for example, five-minute intervals (e.g., every 5 minutes, 10 minutes, 15 minutes, and so on). Other data may also be reported 1110 such as, for example, constraints 1140 affecting DA pricing of one or more ISOs 1115, as well as the start time 1125 and end time 1130 of such constraints 1140. The five-minute report may be implemented by the price reporting unit of the price reporting feature.

Figure 13:
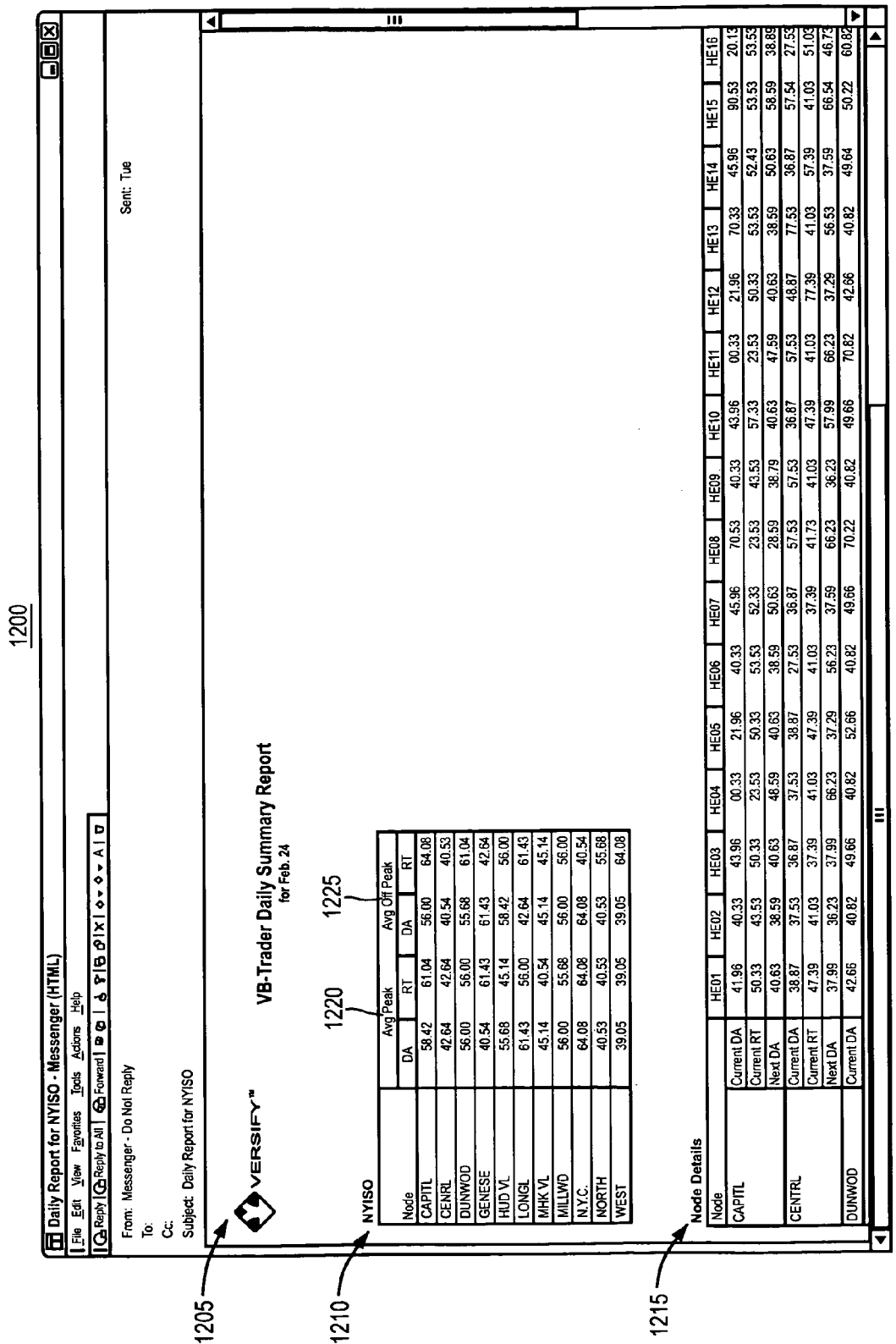
FIG. 13 illustrates an exemplary embodiment of a daily market summary report interface.

FIG. 13 illustrates an exemplary embodiment of a daily market summary report 1200 interface. As illustrated in FIG. 13, the daily market summary report 1205 may comprise an ISO-level summary 1210 and a node details-level summary 1215. The daily market summary report 1205 may be transmitted daily to power trader users 43 via, for example, email or other communication means. The report 1205 may be transmitted at any time after the next day's DA prices are available from one or more ISOs/RTOs. The report 1205 may provide power trader users 43 with a summary or snapshot of one or more corresponding power markets. For example, the report 120 may provide DA and RT prices for average peak times 1220 and average off-peak times 1225. The report 1205 may be implemented by the price reporting unit of the price reporting feature.

The exemplary embodiments described herein not only manage, track, and analyze power and pricing data, but the analysis capabilities aid power traders in determining the causal factors that drive specific ISO/RTO power trading markets. In fact, a system and method are provided for, among other things, evaluating supply and demand fundamentals, power data, pricing data, causal factors, and determining a "real time" (RT) price.

It will be apparent to those skilled in the art that various modifications and variations can be made in the system and method for gathering and performing complex analyses on power data from multiple remote sources, of the present invention, without departing form the spirit or scope of the invention. Thus, it is intended that the invention cover the modifications and variations of this invention provided they come within the scope of the appended claims and their equivalents.

What is claimed is:

1. A system comprising:
   a processor;
   a display unit; and
   a non-transitory data storage device that includes instructions when executed by the processor comprising:
      a data gathering unit to gather power data and locational marginal pricing (LMP) data from a plurality of remote power data sources and to convert the power data and the LMP data into a common data format;
      a data analysis unit to correlate real-time power data with the LMP data for identifying causal factors; and
      a database to store at least the gathered real-time power data and the LMP data, the converted power data and the LMP data, and the correlated data of causal factors,
      wherein the display unit displays at least one of the converted power data and the LMP data, and the correlated data of causal factors, and
      wherein the data gathering unit gathers the real-time power data and the LMP data over a network to correlate the real-time power data.

2. The system of claim 1, further comprising an access unit to grant access to one or more remote users.

3. The system of claim 2, wherein the one or more remote users are power traders in at least one power trading market.

4. The system of claim 1, further comprising a remote user device.

5. The system of claim 4, wherein the display unit transmits display signals to the remote user device.

6. The system of claim 1, further comprising a price reporting unit to generate at least one price summary report.

7. The system of claim 6, wherein the price summary report is presented based on filter criteria, the filter criteria including at least one of a price report type, start date, end date, day type, hour type, independent system operator (ISO) type, node type, delta value, standard deviation value, rank-by value, and LMP type.

8. The system of claim 7, wherein the price report type includes at least one of a scouting summary, scouting detail, hourly spread, hourly averages, node ranking, top nodes, LMP breakdown, day ahead (DA) constraints, constraint frequency, weather forecast, weather forecast versus actual forecast, fuel prices, financial transmission rights (FTR) monthly auction, RSG/OP reserves, and transmission outages.

9. The system of claim 1, further comprising a chart analysis unit to compare at least one of the converted power data and the LMP data and the correlated data of causal factors and to generate at least one chart analysis report.

10. The system of claim 9, wherein the chart analysis report is generated based on filter criteria, the filter criteria including at least one of a start date, an end date, a day type, a hour type, a time zone type, a plurality of node types, a plurality of ISO/zone types, a plurality of weather types, and a compare nodes type.

11. The system of claim 1, further comprising a price look-back unit to retrieve the converted power data and the LMP data, and the correlated data of causal factors according to at least look-back criteria.

12. The system of claim 11, wherein the look-back criteria includes at least one of a temperature value, a load value, an outage value, an ISO type, a weather type, a forecast date, a day value, a hour type, a matching hour value, a start date, and an end date.

13. The system of claim 11, wherein the look-back criteria includes at least one of a fuel index type, a fuel index price, a constraint type, and a transmission outage type.

14. The system of claim 11, wherein the retrieved data is passed to a price reporting unit to generate at least one price look-back report according to filter criteria.

15. The system of claim 14, wherein the filter criteria includes at least a price report type.

16. The system of claim 11, further comprising a look-back results unit to display the retrieved data according to at least one of a date value, a day value, an average load forecast value, an outage value, an actual outage value, an average temperature value, a spot fuel value, and a price report type.

17. The system of claim 11, further comprising a compare node unit to compare nodes to the retrieved data.

18. A computer-implemented method executed by one or more computer processors comprising:
 a display unit; and
 a non-transitory data storage device that includes instructions when executed by the one or more processors, the method comprising the steps of:
 gathering power data and locational marginal pricing (LMP) data from a plurality of remote power data sources and converting the power data and the LMP data into a common data format;
 correlating real-time power data using the one or more computer processors with the LMP data for identifying causal factors;
 storing at least the gathered real-time power data and the LMP data, the converted power data and the LMP data, and the correlated data of causal factors; and
 displaying at least one of the converted power data and the LMP data, and the correlated data of causal factors.

19. The computer-implemented method of claim 18, wherein the gathering of power data and LMP data from a plurality of remote power data sources is performed over a network.

20. The computer-implemented method of claim 18, further comprising the step of granting access to one or more remote users.

21. The computer-implemented method of claim 20, wherein the one or more remote users are power traders in at least one power trading market.

22. The computer-implemented method of claim 18, wherein the displaying step further comprises displaying signals on a remote user device.

23. The computer-implemented method of claim 22, wherein the displaying signals are transmitted to the remote user device.

24. The computer-implemented method of claim 18, further comprising the step of generating at least one price summary report.

25. The computer-implemented method of claim 24, wherein the price summary report is generated based on filter criteria, the filter criteria including at least one of a price report type, start date, end date, day type, hour type, independent system operator (ISO) type, node type, delta value, standard deviation value, rank-by value, and LMP type.

26. The computer-implemented method of claim 25, wherein the price report type includes at least one of a scouting summary, scouting detail, hourly spread, hourly averages, node ranking, top nodes, LMP breakdown, day ahead (DA) constraints, constraint frequency, weather forecast, weather forecast versus actual forecast, fuel prices, financial transmission rights (FTR) monthly auction, RSG/OP reserves, and transmission outages.

27. The computer-implemented method of claim 18, further comprising the step of comparing at least one of the converted power data and the LMP data and the correlated data of causal factors and generating at least one chart analysis report.

28. The computer-implemented method of claim 27, wherein the chart analysis report is generated based on filter criteria, the filter criteria including at least one of a start date, an end date, a day type, a hour type, a time zone type, a plurality of node types, a plurality of ISO/zone types, a plurality of weather types, and a compare nodes type.

29. The computer-implemented method of claim 18, further comprising the step of retrieving the converted power data and the LMP data, and the correlated data of causal factors according to at least look-back criteria.

30. The computer-implemented method of claim 29, wherein the look-back criteria includes at least one of a temperature value, a load value, an outage value, an ISO type, a weather type, a forecast date, a day value, a hour type, a matching hour value, a start date, and an end date.

31. The computer-implemented method of claim 29, wherein the look-back criteria includes at least one of a fuel index type, a fuel index price, a constraint type, and a transmission outage type.

32. The computer-implemented method of claim 29, further comprising the step of passing the retrieved data and generating at least one price summary report according to filter criteria.

33. The computer-implemented method of claim 32, wherein the filter criteria includes at least a price report type.

34. The computer-implemented method of claim 29, further comprising the step of displaying the retrieved data according to at least one of a date value, a day value, an average load forecast value, an outage value, an actual outage value, an average temperature value, a spot fuel value, and a price report type.

35. The computer-implemented method of claim 29, further comprising the step of comparing nodes to the retrieved data.

36. A non-transitory computer-readable storage medium, storing one or more programs configured for execution by one or more processors, the one or more programs comprising instructions to:

gather power data and locational marginal pricing (LMP) data from a plurality of remote power data sources and convert the real-time power data and the LMP data into a common data format;

correlate real-time power data with the LMP data for identifying causal factors;

store at least the gathered real-time power data and the LMP data, the converted power data and the LMP data, and the correlated data of causal factors; and display at least one of the converted power data and the LMP data, and the correlated data of causal factors.

* * * * *